US012572321B2

(12) United States Patent
Park et al.

(10) Patent No.: US 12,572,321 B2
(45) Date of Patent: Mar. 10, 2026

(54) ELECTRONIC DEVICE FOR SUPPORTING AUDIO SHARING

(71) Applicant: Samsung Electronics Co., Ltd.,
Suwon-si (KR)

(72) Inventors: Jinki Park, Suwon-si (KR);
Kwangyong Choi, Suwon-si (KR);
Misun Kim, Suwon-si (KR); Sangheon Kim, Suwon-si (KR); Mira Seo,
Suwon-si (KR); Sungki Park, Suwon-si
(KR); Yeunwook Lim, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 300 days.

(21) Appl. No.: 18/156,036

(22) Filed: Jan. 18, 2023

(65) Prior Publication Data

US 2023/0289128 A1     Sep. 14, 2023

Related U.S. Application Data

(63) Continuation      of      application      No.
PCT/KR2021/009973, filed on Jul. 30, 2021.

(30) Foreign Application Priority Data

Aug. 3, 2020     (KR) ........................ 10-2020-0096567

(51) Int. Cl.
*G06F 3/16*               (2006.01)
(52) U.S. Cl.
CPC .............. *G06F 3/165* (2013.01); *G06F 3/162*
(2013.01)

(58) Field of Classification Search
CPC ................................ G06F 3/165; G06F 3/162
See application file for complete search history.

(56) References Cited

U.S. PATENT DOCUMENTS 9,820,323 B1      11/2017   Young et al.
11,080,004 B2 *    8/2021   Carrigan ................. G06F 3/167
                            (Continued)

FOREIGN PATENT DOCUMENTS

EP           3 668 070 A2      6/2020
KR      10-2011-0083360 A      7/2011
                            (Continued)

OTHER PUBLICATIONS

Korean Office Action dated Mar. 19, 2025, issued in Korean
Application No. 10-2020-0096567.

*Primary Examiner* — Joseph Saunders, Jr.
(74) *Attorney, Agent, or Firm* — Jefferson IP Law, LLP

(57) ABSTRACT

An electronic device is provided. The electronic device
includes a communication circuit for short-range wireless
communication with an external electronic device, a touch-
sensitive display, and a processor connected to the commu-
nication circuit and the display, wherein the processor can be
configured to receive, from the external electronic device,
through the communication circuit, a list related to one or
more audio output devices wirelessly connected to the
external electronic device, display the list on the display,
select a target device from among the one or more audio
output devices on the basis of a user input received from the
display during displaying of the list, and transmit, to the
external electronic device, through the communication cir-
cuit, information related to the target device and audio to be
outputted through the target device.

15 Claims, 19 Drawing Sheets

(56)                    References Cited

U.S. PATENT DOCUMENTS

| 2005/0114646 | A1 | 5/2005 | Rekimoto et al. |
| 2007/0127747 | A1 | 6/2007 | Doyle |
| 2017/0235461 | A1 | 8/2017 | Oh et al. |
| 2018/0219856 | A1* | 8/2018 | Mushikabe ...... H04N 21/43615 |
| 2018/0267773 | A1 | 9/2018 | Kim et al. |
| 2018/0279050 | A1 | 9/2018 | Ryu |
| 2019/0034161 | A1 | 1/2019 | Jo et al. |
| 2019/0387329 | A1 | 12/2019 | Meister |
| 2020/0186926 | A1 | 6/2020 | Park et al. |
| 2020/0382569 | A1 | 12/2020 | Fornshell et al. |

FOREIGN PATENT DOCUMENTS

| KR | 10-1150630 | B1 | 6/2012 |
| KR | 10-2014-0012504 | A | 2/2014 |
| KR | 10-2015-0095124 | A | 8/2015 |
| KR | 10-1790429 | B1 | 10/2017 |
| KR | 10-2018-0106231 | A | 10/2018 |
| KR | 10-2018-0108310 | A | 10/2018 |
| KR | 10-2019-0013062 | A | 2/2019 |
| KR | 10-2019-0028043 | A | 3/2019 |
| WO | 2018/098136 | A1 | 5/2018 |
| WO | 2018/169365 | A1 | 9/2018 |

* cited by examiner

Figure 10:
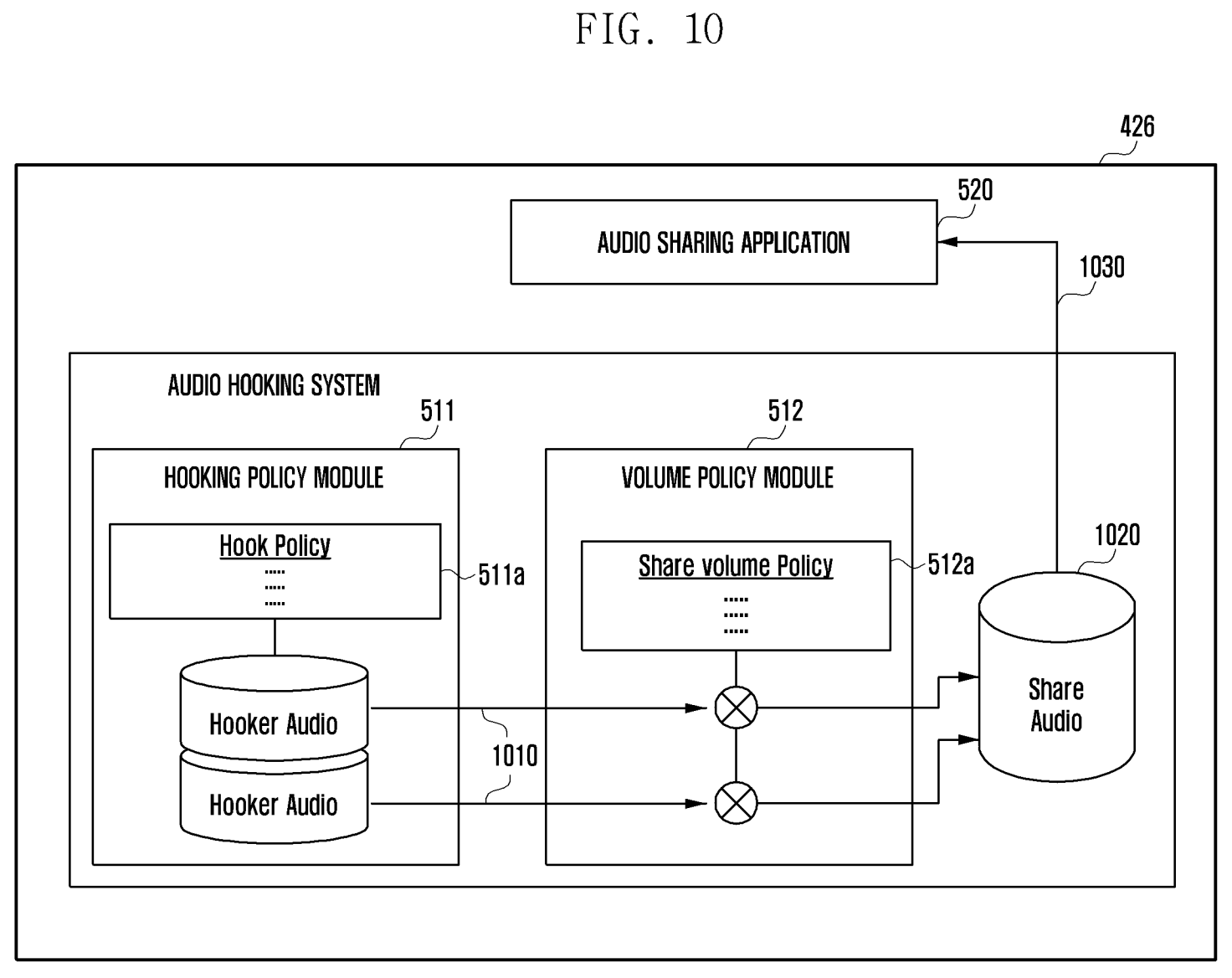

AUDIO SHARING APPLICATION 520

1030

AUDIO HOOKING SYSTEM

HOOKING POLICY MODULE 511

Hook Policy 511a
::::

Hooker Audio

Hooker Audio

1010

VOLUME POLICY MODULE 512

Share volume Policy 512a
::::

Share Audio 1020

MAKE REQUEST FOR INFORMATION ON AUDIO OUTPUT
DEVICES TO HOST DEVICE    1510

RECEIVE AUDIO OUTPUT DEVICE LIST FROM HOST DEVICE    1520

TRANSMIT IDENTIFICATION INFORMATION OF TARGET DEVICE TO
OUTPUT AUDIO DATA TO BE SHARED TO HOST DEVICE    1530

TRANSMIT AUDIO DATA TO BE SHARED TO HOST DEVICE    1540

ELECTRONIC DEVICE FOR SUPPORTING AUDIO SHARING

CROSS-REFERENCE TO RELATED APPLICATION(S)

This application is a continuation application, claiming priority under § 365(c), of an International application No. PCT/KR2021/009973, filed on Jul. 30, 2021, which is based on and claims the benefit of a Korean patent application number 10-2020-0096567, filed on Aug. 3, 2020, in the Korean Intellectual Property Office, the disclosure of which is incorporated by reference herein in its entirety.

BACKGROUND

1. Field

The disclosure relates to an electronic device configured to reproduce audio and support reproduction of the same audio in another electronic device.

2. Description of Related Art

A user may share audio to which the user is listening with another person. For example, an electronic device (for example, a smartphone) may be wirelessly connected to a plurality of audio output devices (for example, wireless earphones) and simultaneously output audio reproduced in the electronic device through the audio output devices. The electronic device may share audio with another electronic device to allow the other electronic device to independently reproduce the audio.

The above information is presented as background information only to assist with an understanding of the disclosure. No determination has been made, and no assertion is made, as to whether any of the above might be applicable as prior art with regard to the disclosure.

SUMMARY

According to the conventional audio sharing method, even a sound (for example, an alarm or a notification) which a user (or another person) does not want to share may be shared with other people. During the output of audio through a plurality of audio output devices (for example, wireless earphones), it is not easy to change an audio path to another audio output device (for example, an audio output device installed in a vehicle).

In various embodiments of the disclosure, an electronic device may share audio with another electronic device except for predetermined audio (for example, alarms). The electronic device may easily change the audio path through another electronic device.

Aspects of the disclosure are to address at least the above-mentioned problems and/or disadvantages and to provide at least the advantages described below. Accordingly, an aspect of the disclosure is to provide an electronic device configured to reproduce audio and support reproduction of the same audio in another electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit for short-range wireless communication with an external electronic device, a touch-sensitive display, and a processor connected to the communication circuit and the display, wherein the processor is configured to receive a list of at least one audio output device wirelessly connected to the external electronic device from the external electronic device through the communication circuit, display the list on the display, select a target device from among the at least one audio output device, based on a user input received from the display while the list is displayed, and transmit information on the target device and audio to be output through the target device through the communication circuit.

In accordance with another aspect of the disclosure, an electronic device is provided. The electronic device includes a first communication circuit for short-range wireless communication with an external electronic device, a second communication circuit for short-range wireless communication with an audio output device, and a processor connected to the first communication circuit and the second communication circuit, wherein the processor is configured to transmit a list of at least one audio output device connected to the electronic device through the second communication circuit to the external electronic device through the first communication circuit, receive identification information of a target device among the at least one audio output device from the external electronic device through the first communication circuit, and output audio received from the external electronic device through the first communication circuit to the target device through the second communication circuit.

According to various embodiments, an electronic device can share audio with other electronic devices except for predetermined audio (for example, alarms). The electronic device can easily change the audio path through another electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an electronic device within a network environment according to an embodiment of the disclosure;

FIG. 3 illustrates an audio sharing system according to an embodiment of the disclosure;

FIG. 5 illustrates a configuration of the audio share manager according to an embodiment of the disclosure;

FIG. 10 illustrates an operation in which the audio share manager determines a volume of audio to be shared, which is to be transmitted to a host device according to an embodiment of the disclosure;

FIG. 14 illustrates a method by which the audio sharing system outputs different pieces of audio through a plurality of audio output devices according to an embodiment of the disclosure.

Throughout the drawings, it should be noted that like reference numbers are used to depict the same or similar elements, features, and structures.

DETAILED DESCRIPTION

Figure 2:
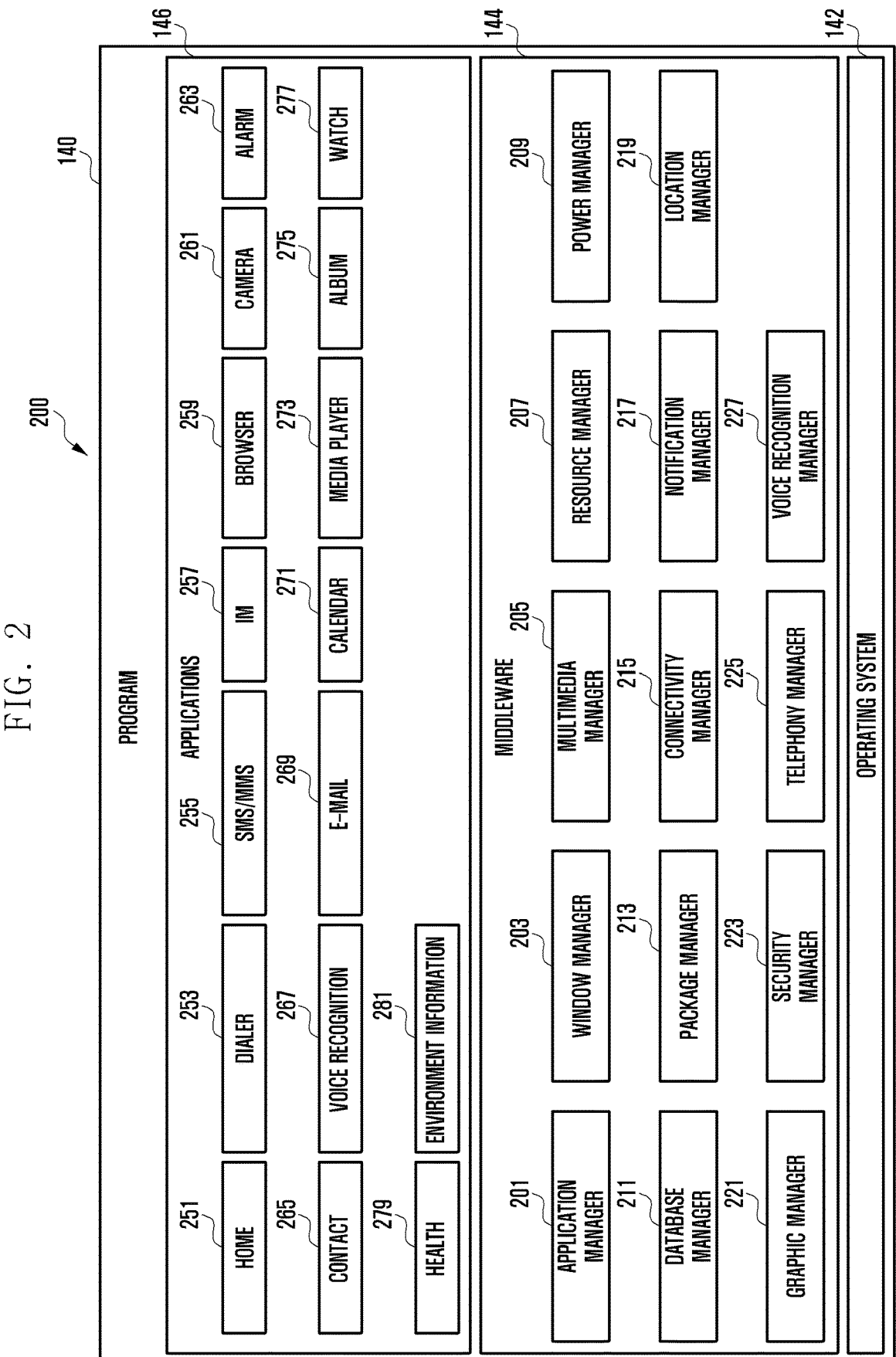
FIG. 2 is a block diagram illustrating a program according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
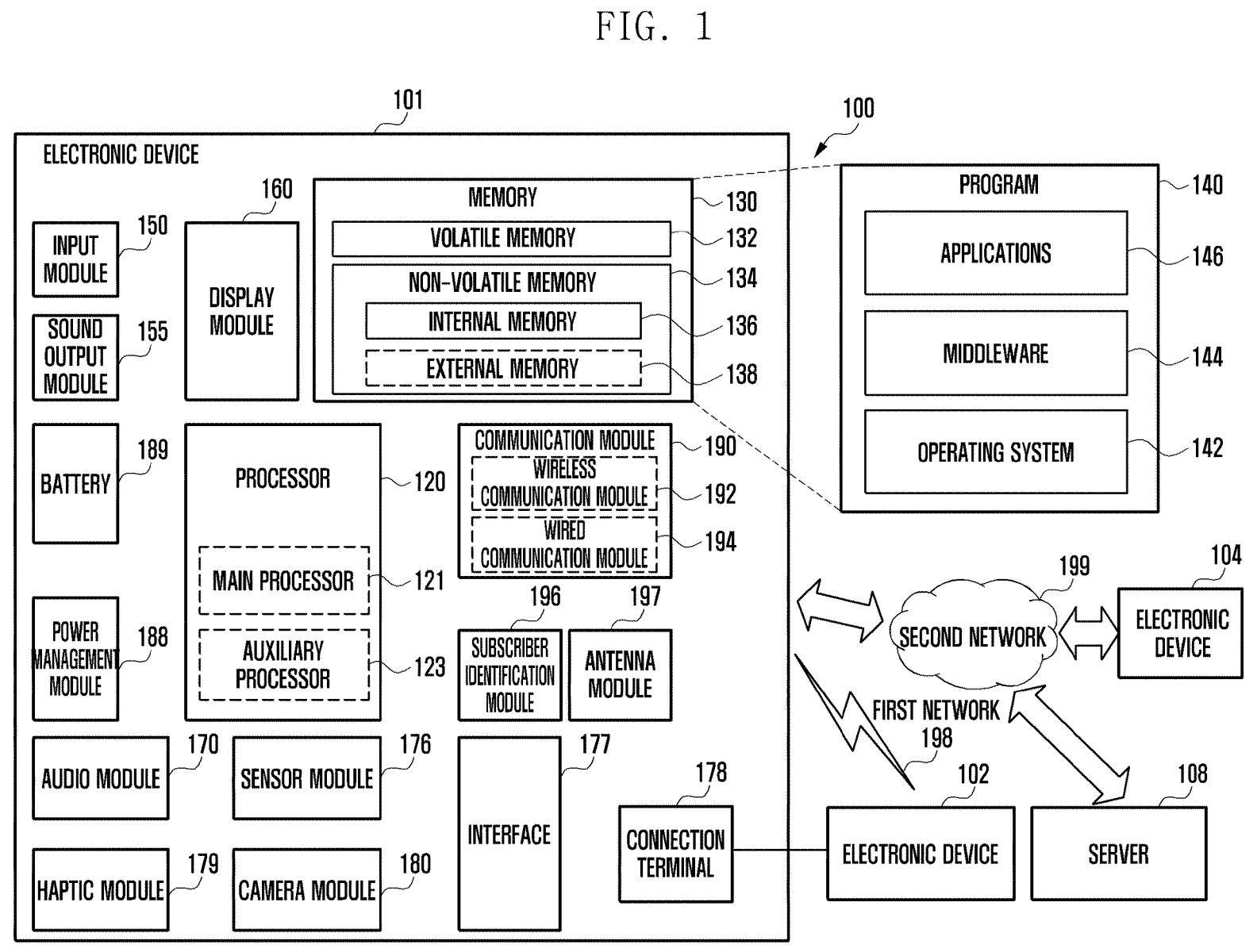

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram illustrating the program according to an embodiment of the disclosure.

According to an embodiment of the block diagram 200, the program 140 may include an operating system (OS) 142 to control one or more resources of the electronic device 101, middleware 144, or an application 146 executable in the OS 142. The OS 142 may include, for example, Android™, iOS™, Windows™, Symbian™ Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In this document, 'audio' may refer to audio data stored in an electronic device (e.g., the electronic device 101), an audio signal to be output from the electronic device through a speaker, or an audio signal to be transmitted (e.g., broadcast) from the electronic device to another electronic device.

Figure 3:
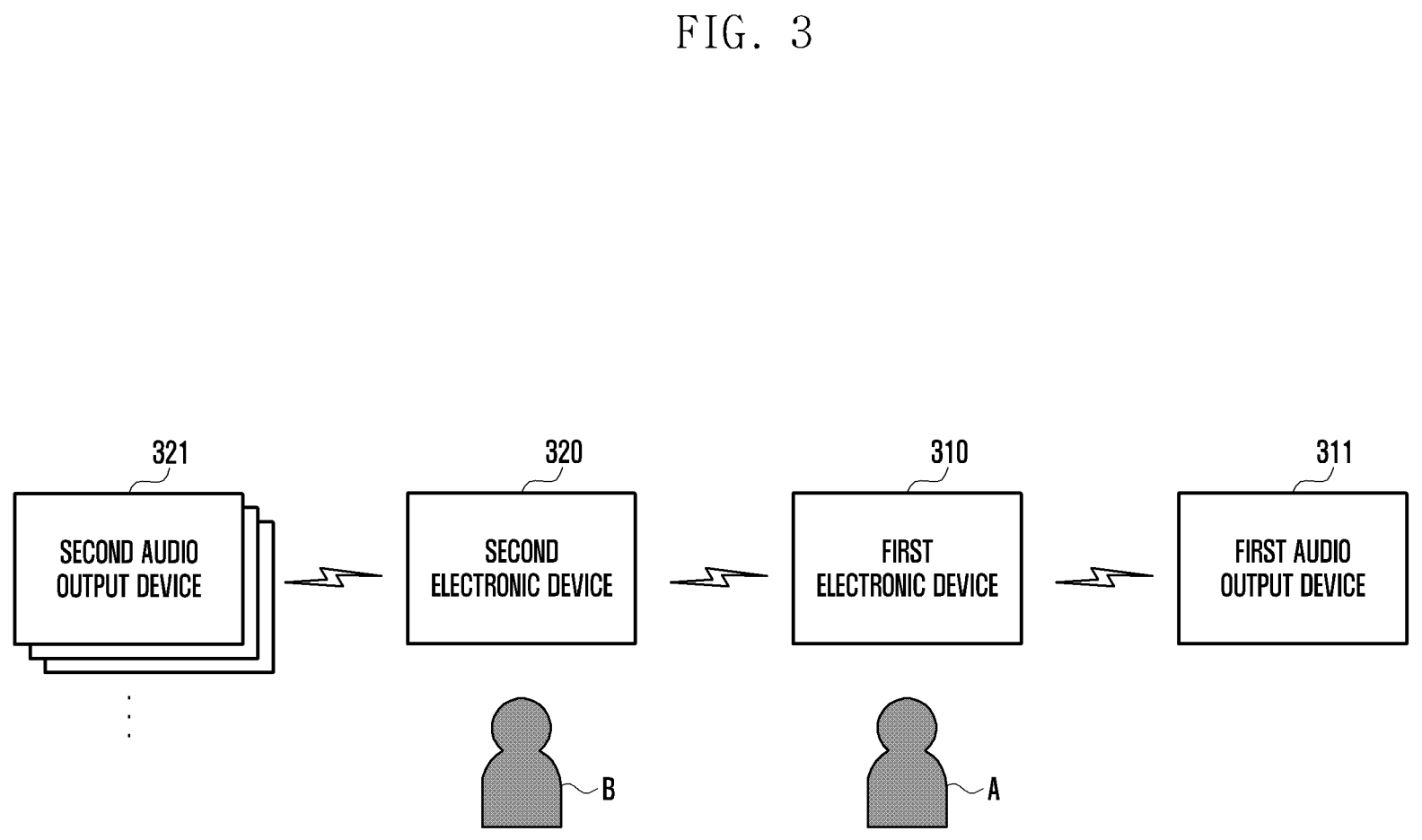

FIG. 3 illustrates an audio sharing system according to an embodiment of the disclosure.

Referring to FIG. 3, the audio sharing system may include a first electronic device (for example, a guest device or a server device) 310, a first audio output device 311 wirelessly connected to the first electronic device 310 through a short-range wireless communication (for example, Bluetooth) circuit, a second electronic device (for example, a host device or a client device) 320, and at least one second audio output device 321 wirelessly connected to the second electronic device 320 through a short-range wireless com-munication (for example, Bluetooth) circuit. All or some of the configurations of the first electronic device 310 and the second electronic device 320 may be the same as the electronic device 101 of FIG. 1. The first electronic device 310 and the second electronic device 320 may be wirelessly connected through a short-range wireless communication (for example, Bluetooth, Wi-Fi direct, or Wi-Fi Aware) circuit. The Wi-Fi direct may support direct data communication between a group owner (for example, the first electronic device) and at least one group client (for example, the second electronic device 320) after a negotiation process in which electronic devices determine the group owner. The Wi-Fi Aware may support direct data communication between electronic devices (for example, the first electronic device 310 and the second electronic device 320) without any negotiation process.

The first electronic device 310 and the first audio output device 311 are owned by a user A, and the second electronic device 320 and the second audio output device 321 is owned by a user B. Connecting the second audio output device 321 to the first electronic device 310 through, for example, Bluetooth may inconvenience the user B owning the second audio output device 321 or may be temporally cumbersome work.

According to an embodiment, the first electronic device 310 may output audio to the second audio output device 321 through the second electronic device 320 without any direct connection with the second audio output device 321. For example, the user A may make a request, to the user B, for activating an audio sharing function to the user B in order to listen to music which the user A likes or is currently listening to through the first audio output device 311 with the user B. The second electronic device 320 may activate the audio sharing function according to an input of the user B received through an input device (for example, a touch-sensitive display). The first electronic device 310 may make a request for information on the audio output device connected to the second electronic device 320 to the second electronic device 320 according to an input of the user A. In the state in which the audio sharing function is activated, the second electronic device 320 may transmit an audio output list of at least one second audio output device 321 to the first electronic device 310 in response to the request. The first electronic device 310 may display the received list on a display. For example, the list may include identification information (for example, a user name) for identifying the user B and identification information (for example, a product name) of each of the second audio output devices 321 connected to the second electronic device 320. For example, with respect to every product name (for example, Galaxy Buds) of the second audio output device 321, the first electronic device 310 may display a name of the user (for example, user B) owning the corresponding product to be adjacent to the product name. The first electronic device 310 may select an audio output device (hereinafter, referred to as a target device) to output the audio from the list on the basis of a user input. The first electronic device 310 may transmit audio which will be shared (hereinafter, referred to as audio to be shared) with the second electronic device 320 and identification information of the target device to the second electronic device 320. The second electronic device 320 may perform an operation of reproducing (playing back or regenerating) the audio to be shared, received from the first electronic device 310, through the target device. The reproduction operation may include, for example, an operation of storing the audio to be shared, received from the first electronic device 310, in a memory (for example, a buffer), an operation of decoding the stored audio to be shared, and an operation of outputting the decoded audio to be shared to the target device through a short-range wireless communication circuit.

According to an embodiment, the first electronic device 310 may change the target device on the basis of a user input. For example, after the selection of the target device, the first electronic device 310 may display the list again according to reception of the user input for reselection through the input device and select again an audio output device selected by the user from the list as a new target device.

According to an embodiment, the first electronic device 310 may select predetermined audio among a plurality of pieces of audio as the audio to be shared. For example, the first electronic device 310 may select audio which is being output through the first audio output device 311 as the audio to be shared. The first electronic device 310 may select (pieces of) audio in a play list which waits to be output to the first audio output device 311 as the audio to be shared. When there is no current audio which is being reproduced or waits to be reproduced, the first electronic device 310 may display an audio list (for example, a playlist) on the display and select audio selected by the user from the list as the audio to be shared. The first electronic device 310 may transmit the selected audio to be shared to the second electronic device 320. For example, the first electronic device 310 may copy the selected audio to be shared and transmit the copy to the second electronic device 320. The copy may include volume data to allow the second electronic device 320 to determine an audio volume independently from a volume policy established in the first electronic device 310 when the audio is reproduced in the second electronic device 320.

According to an embodiment, the first electronic device 310 may perform an operation of limiting the audio to be shared with the second electronic device 320 to predetermined audio. For example, the first electronic device 310 may limit the audio to be shared to audio reproduced using a predetermined application (for example, a music reproduction app). In another example, among various types of audio (for example, a clock alarm, a message reception notification sound, a call reception notification sound, a call voice, or music), only a predetermined type of audio (for example, music) may be shared. Accordingly, the first audio output device 311 may output all pieces of audio generated by the first electronic device 310, and the second audio output device 321 may output only predetermined audio expect for a sound that the first user (A) does not want to share.

According to an embodiment, the first electronic device 310 may display an interface for controlling reproduction of the audio to be shared on the display. For example, the first electronic device 310 may insert a volume control bar, a reproduction controller, and/or a button for releasing audio sharing into the interface and display the interface on the display. The reproduction controller may include a pause/play resumption button, a previous music play button, and/or a next music play button.

According to an embodiment, the second electronic device 320 may display information (for example, identification information indicating the first user (A)) indicating that audio which is being reproduced through the target device is the audio to be shared, received from the first electronic device 310, on the display.

Figure 4:
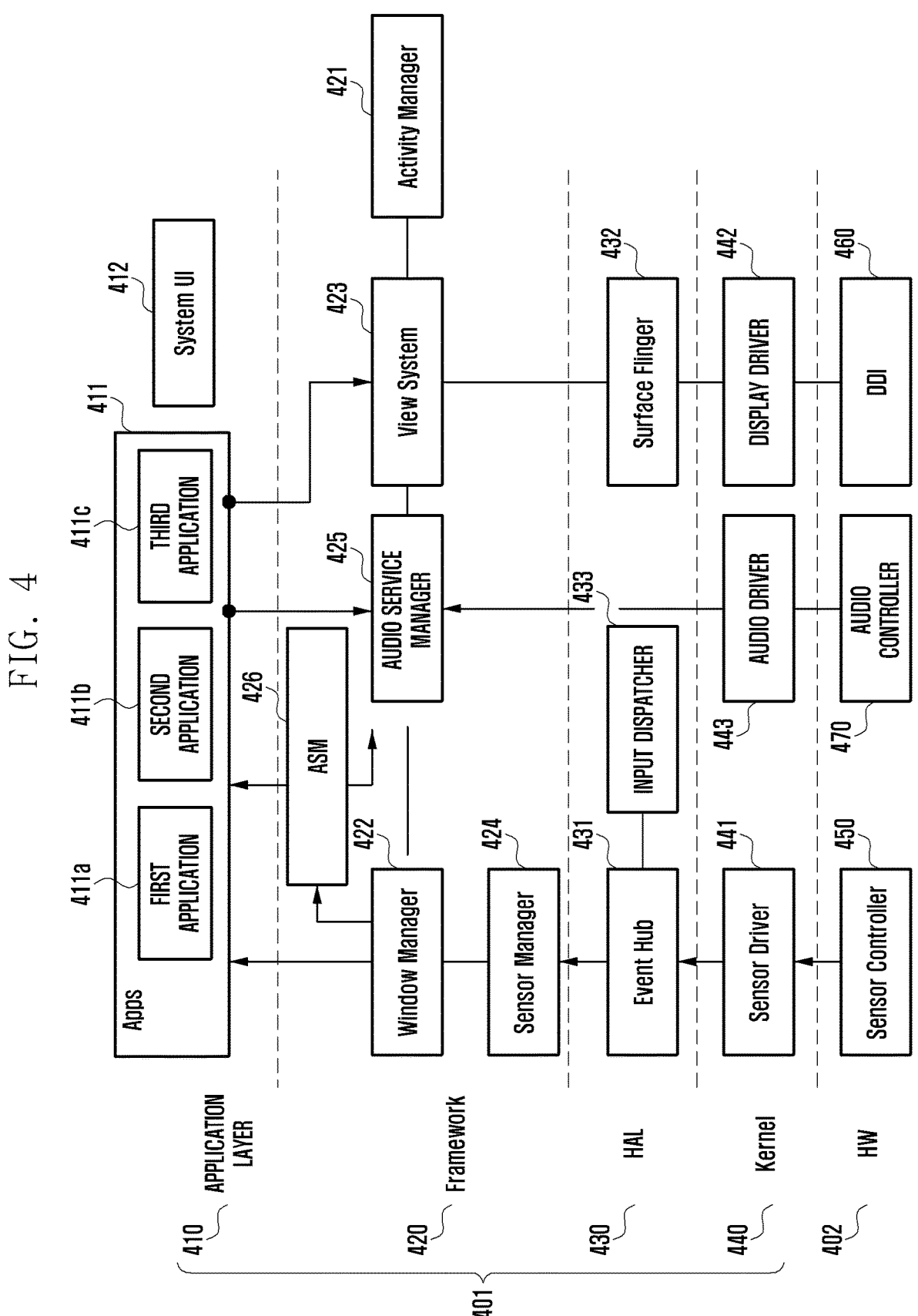
FIG. 4 illustrates hierarchical architecture of the electronic device according to an embodiment of the disclosure.

FIG. 4 illustrates hierarchical architecture of the electronic device according to an embodiment of the disclosure.

Referring to FIG. 4, a description of elements overlapping those in FIG. 2 is omitted or simplified. Referring to FIG. 4, the electronic device (for example, the electronic device 101 of FIG. 1) may include software 401 and hardware 402. The software 401 (for example, the program 140 of FIG. 1) may be loaded to the volatile memory 132 from the non-volatile memory 134 and executed by the processor 120. The software 401 may include an application layer 410, a framework 420, a hardware abstraction layer (HAL) 430, and/or kernel 440. The hardware 402 may include a sensor controller 450, a display driver integrated circuit (IC) (DDI) 460, and/or an audio controller 470.

The application layer 410 (for example, the applications 146 of FIG. 1 or FIG. 2) may include at least one application 411 (for example, a first application 411a, a second application 411b, and a third application 411c) which can be executed by the processor 120, and/or a system UI 412. At least one application 411 is not limited and types thereof may be various such as an Internet browser, a video application, and a game. For example, at least one application 411 may include a reproduction application or an audio sharing application. The system user interface (UI) 412 may be an application for configuring a plurality of graphic user interface (GUI) screens implemented in the electronic device 101 such as a notification bar or a quick view.

The framework 420 (for example, the middleware 144 of FIG. 1 or FIG. 2) may provide various functions to at least one application 411 such that functions or information provided from one or more resources of the electronic device 101 can be used by at least one application 411. The framework 420 may include an activity manager 421, a window manager 422, a view system 423, a sensor manager 424, an audio service manager 425, or an audio share manager (ASM) 426.

The activity manager 421 may control a life cycle and an activity of the application layer 410. The window manager 422 may manage one or more GUI resources used in the screen. The view system 423 may be a set of expandable views used for generating a user interface of the application 411. The sensor manager 424 may provide the application 411 with sensor data to allow the application 411 to use data generated by the sensor (for example, the sensor module 176 of FIG. 1). The audio service manager 425 may detect one or more formats required for producing audio files and encode or decode the audio file by using a codec suitable for the format selected therefrom.

The audio share manager 426 may support a function of sharing audio between electronic devices. In an embodiment, the audio share manager 426 may support a function of allowing the electronic device 101 to operate as a guest device (for example, the first electronic device 10 of FIG. 3). For example, the audio share manager 426 may perform an operation of configuring the audio to be shared on the basis of a predefined policy. The audio share manager 426 may perform an operation of configuring a target device to output the audio to be shared among one or more audio output devices wirelessly connected to a host device (for example, the second electronic device 320 of FIG. 3) on the basis of an operative state (or an active state) of an audio sharing function (or an audio sharing mode or a dual mode). The audio share manager 426 may perform an operation of transmitting the audio to be shared to the host device. In an embodiment, the audio share manager 426 may support a function of allowing the electronic device 101 to operate as the host device. For example, the audio share manager 426 may perform an operation of transmitting information on one or more audio output devices (an audio output device list) wirelessly connected to the electronic device 101 to the guest device in order to allow the guest device to select a target device to output the audio to be shared on the basis of the operative state of the audio sharing function. The audio share manager 426 may perform an operation of outputting the audio to be shared, received from the guest device. In the audio share manager 426, some modules (for example, a data communication module) may be included in the application layer 410 or implemented as separate software.

The HAL 430 may be an abstracted layer between the hardware 402 and the software 401. The HAL 430 may include an event hub 431 for providing an interface that standardizes an event generated by an input dispatcher 433 or the sensor. The input dispatcher 433 may perform a function of determining an application to receive the generated event. The HAL 430 may include a surface flinger 432. The surface flinger 432 may perform a function of providing an execution screen to be displayed on the display among execution screens generated by the application. When the configuration of the display is changed, the surface flinger 432 may make a request for processing the change in resolution and density to the application 411 according to the changed configuration of the display.

The kernel 440 (for example, the operating system 142 of FIG. 1 or FIG. 2) may include various drivers for driving various hardware components included in the electronic device. For example, the kernel 440 may include a sensor driver 441 for driving the sensor controller 450 configured to control the sensor, a display driver 442 for driving the DDI 460 configured to control a display panel, and/or an audio driver 443 for driving the audio controller 470 configured to control an audio output device through a wireless communication circuit (for example, the wireless communication module 192 of FIG. 1).

Figure 5:
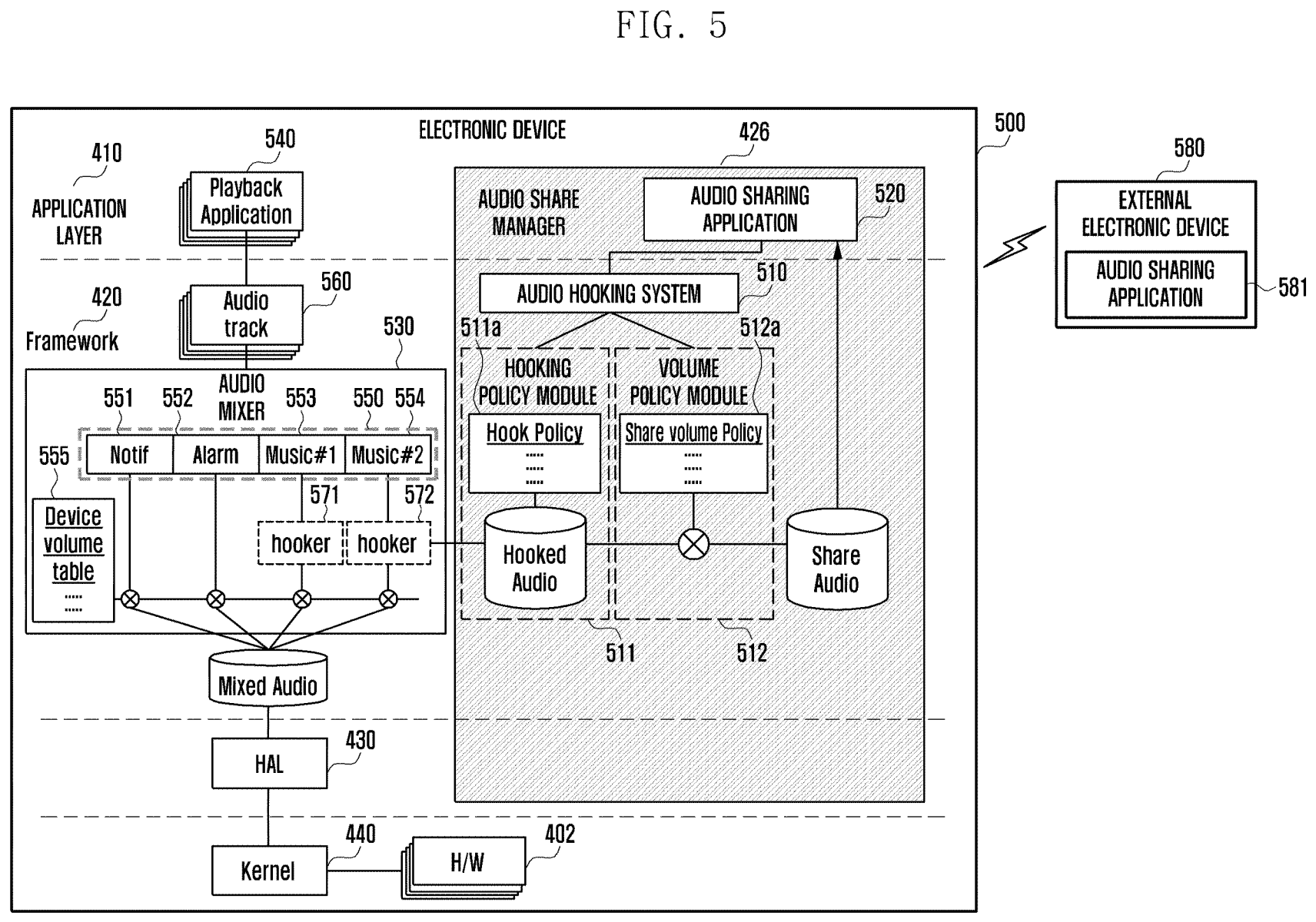

FIG. 5 illustrates a configuration of the audio share manager according to an embodiment of the disclosure.

Referring to FIG. 5, an electronic device 500 may include the audio share manager 426 of FIG. 4. The audio share manager 426 may include an audio hooking system 510 belonging to the framework 420 and an audio sharing application 520 belonging to the application layer 410. The audio hooking system 510 may determine a policy for audio sharing. In an embodiment, the audio hooking system 510 may include a hooking policy module 511 and a volume policy module 512.

The hooking policy module 511 may determine audio to be hooked as the audio to be shared among audio 550 (for example, audio 551, 552, 553, and 554) mixed by an audio mixer 530 on the basis of a predefined hooking policy 511a. For example, a reproduction application 540 may provide the audio mixer 530 with an audio track 560 encoded in, for example, a pulse coding modulation (PCM) scheme. The audio mixer 530 may select music #1 553 and music #2 554 from the audio track 560 and mix the same with a notification 551 and an alarm 552. The audio mixer 530 may mix the audio 551, 552, 553, and 554 with volume data selected from a device volume table 555 and provide the same to the HAL 430. When the audio sharing application 520 makes a request for providing the audio to be shared, the hooking policy module 511 may determine music (for example, music #1 553 and music #2 554) among the audio 550 as the audio to be shared, which is to be hooked, on the basis of the hooking policy 511a. Accordingly, the hooking policy module 511 may add hookers 571 and 572 to copy the audio to be shared to the audio mixer 530. The hooking policy module 511 may receive the audio to be shared from the hookers 571 and 572 included in the audio mixer 530 and provide the received audio to be shared to the audio sharing application 520.

The volume policy module 512 may determine a volume of the audio to be shared on the basis of a predefined volume policy 512a. The volume policy module 512 may add volume data according to the determination to the audio to be shared, provided to the audio sharing application 520.

When the electronic device 500 operates as the guest device and an external electronic device 580 operates as the host device, the audio sharing application 520 may make a request for providing the audio to be shared to the audio hooking system 510 and provide the audio to be shared, received from the audio hooking system 510, to an audio sharing application 581 of the external electronic device 580 through a network (for example, the first network 198 of FIG. 1). When the electronic device 500 operates as the host device and the external electronic device 580 operates as the guest device, the audio sharing application 520 may receive the audio to be shared from the external electronic device 580 through the network. The audio sharing application 520 may control the reproduction application 540 to reproduce the audio to be shared, received from the external electronic device 580, through a target device selected by the external electronic device 580.

FIGS. 6A, 6B, 6C, and 6D illustrate GUI screens of the reproduction application displayed on the guest device according to various embodiments of the disclosure.

Figure 6A:
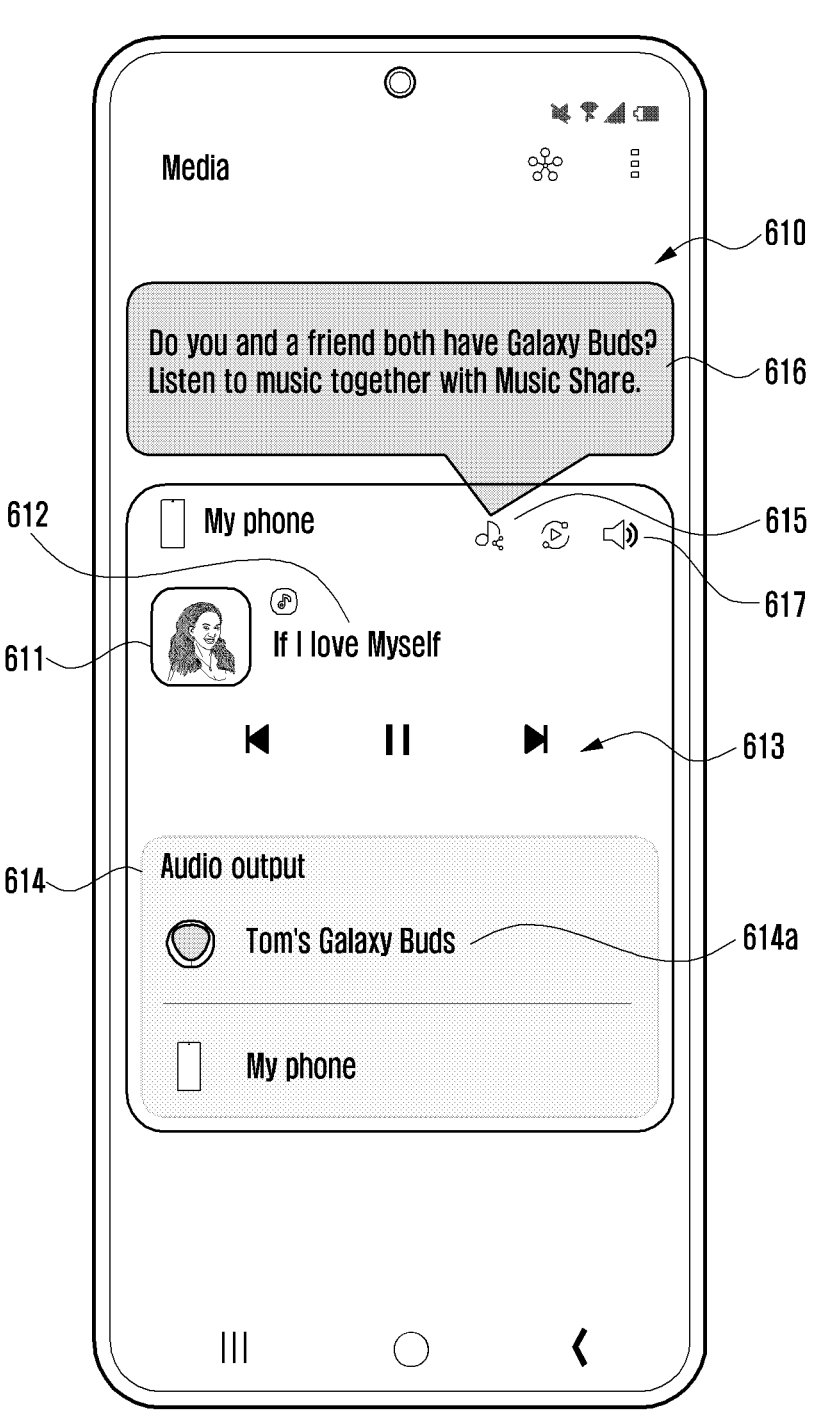
FIGS. 6A, 6B, 6C, and 6D illustrate graphical user interface (GUI) screens of the reproduction application displayed on the guest device according to various embodiments of the disclosure.

Referring to FIG. 6A, the guest device (for example, the electronic device 101 of FIG. 1 or the first electronic device 310 of FIG. 3) may display a GUI screen 610 of the reproduction application (for example, the reproduction application 540 of FIG. 5) on the display (for example, the display module 160 of FIG. 1). For example, the guest device may display the GUI screen 610 including a representative image 611 of a song which is being currently reproduced, a song name 612, and a reproduction controller 613 on the display. The guest device may display the GUI screen 610 further including an audio output device list 614 on the display. The list 614 may include identification information 614a of an audio output device (for example, the first audio output device 311 of FIG. 3) connected to the guest device through a short-range wireless communication (for example, Bluetooth) circuit. The guest device may display the GUI screen 610 further including an icon 615 for initiating audio sharing with the host device (for example, the second electronic device 320 of FIG. 3) and an icon 617 for calling an audio volume control bar on the display. The guest device may display a tip 616 informing the user of the guest device that a function of entering the icon 615 is the audio sharing function within the GUI screen 610. For example, when initially connected to the host device, the guest device may display the tip 616 on the display. The guest device may receive a user input for the icon 615 from the display and display a popup window 620 of FIG. 6B on the display in response thereto.

Figure 6B:
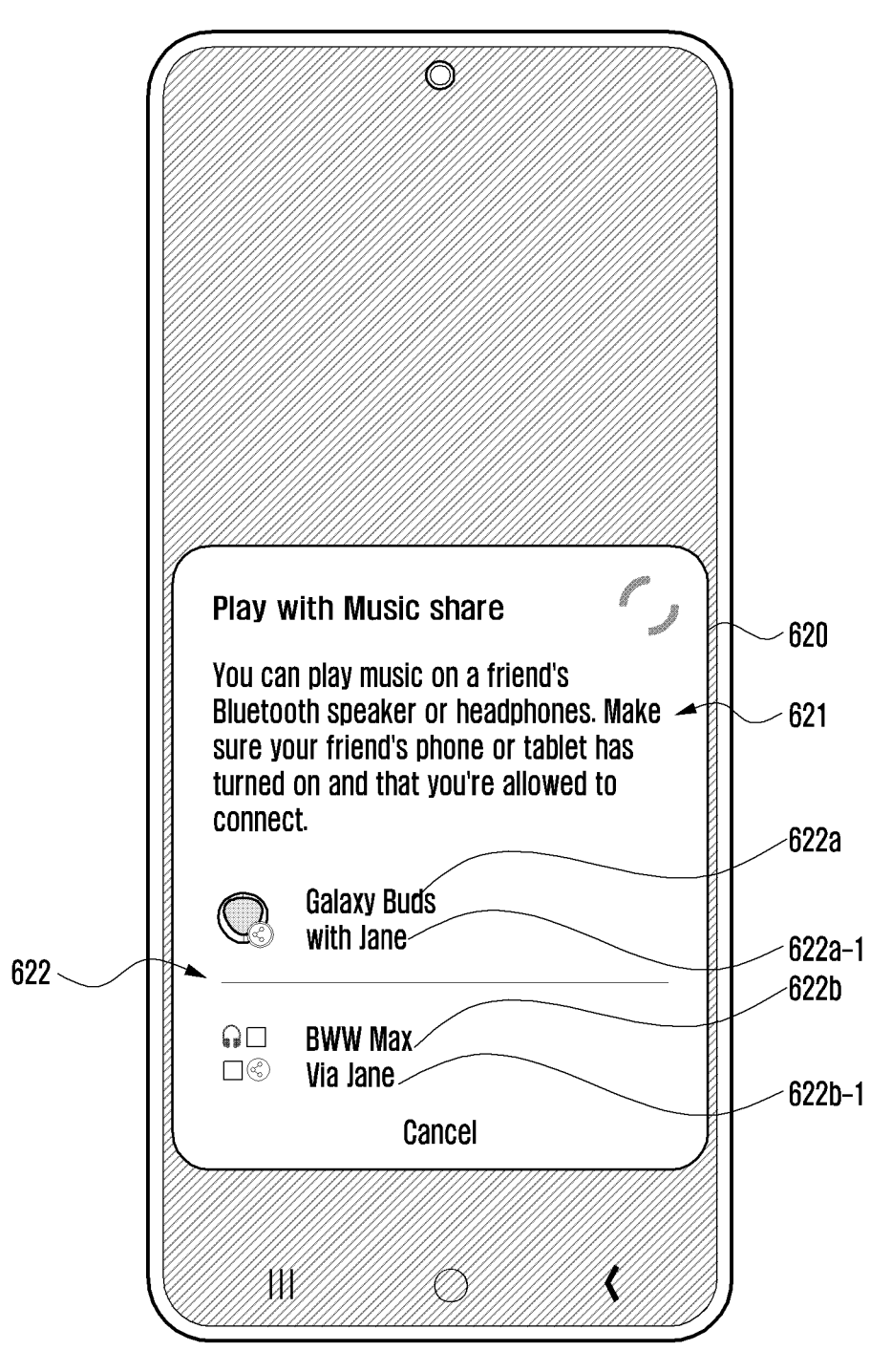

Referring to FIG. 6B, the guest device may display a tip 621 for informing the user that a song which is being currently reproduced can be shared through the host device and informing the user of a configuration of the host device for reproducing the song in the host device through the popup window 620. The guest device may display an audio output device list 622 received from the host device through the popup window 620. For example, the guest device may receive a product name 622a of an audio output device (for example, Galaxy Buds) or a product name 622b of a device in which the audio output device is installed (for example, BMW Mini) from the host device and display the list 622 including the product names. When an owner (user) profile (for example, a mobile phone number) received from the host device exists in a contact list of the guest device, the guest device may identify a name of the owner (for example, Jane) in the contact list and display the identified name and the corresponding product name on the list 622. When the user profile of the host device does not exist in the contact list of the guest device, the guest device may display identification information of the host device (for example, a product name) instead of the owner name. The guest device may display the list 622 including first information (for example, with name) 622*a*-1 indicating that the audio output device of the guest device and the audio output device of the host device can substantially simultaneously output the song and second information (for example, via) 622*b*-1 indicating that an audio path (or an audio output path) of the song which is being reproduced can be changed from the audio output device of the guest device to the audio output device of the host device on the display. In an embodiment, the guest device may recognize the type of the audio output device connected to the host device, for example, the product name and display the first information 622*a*-1 or the second information 622*b*-1 and the corresponding product name on the basis of the recognized type. For example, the guest device may recognize that the type of the audio output device is wireless earphones on the basis of the product name 622*a* and, accordingly, display the first information 622*a*-1 at a location close to the product name 622*a*. The guest device may recognize that the type of the audio output device is different from that of the wireless earphones (for example, a vehicle, a television (TV), an audio output device installed in a refrigerator, or a speaker (for example, an artificial intelligence (AI) speaker)) on the basis of the product name 622*b* and, accordingly, display the second information 622*b*-1 at a location close to the product name 622*b*. The guest device may receive, from the display, a user selection for the target device (for example, a touch input for the product name 622*a*) from the list 622 and display the GUI screen 610 of FIG. 6C on the display in response thereto.

Figure 6C:
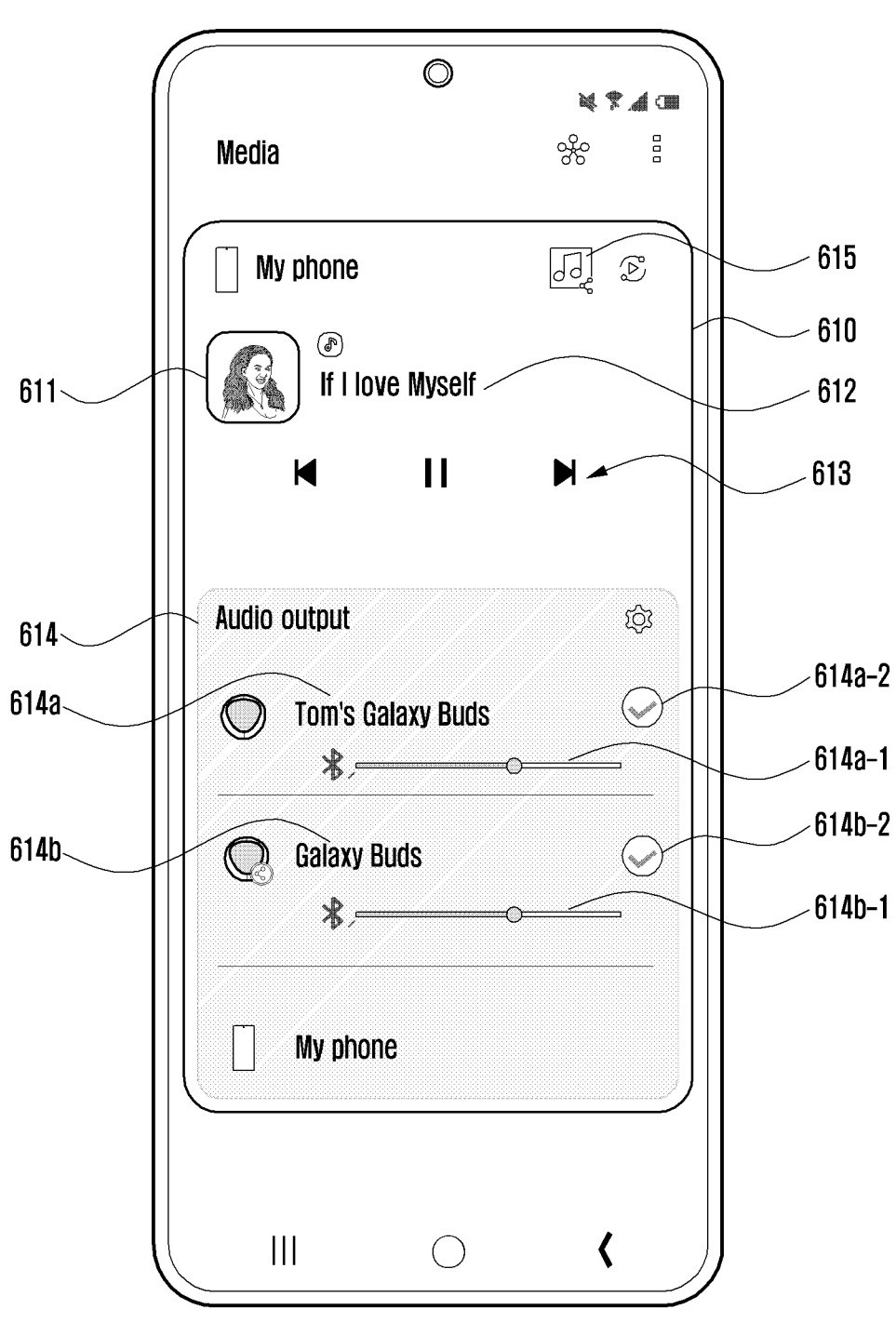

Referring to FIG. 6C, the guest device may display the GUI screen 610 including the audio output device list 614 further including the identification information 514*b* of the target device on the display. The guest device may remove the icon 617 from the GUI screen 610. The guest device may display the audio output device list 614 further including a volume control bar 614*a*-1 for controlling a volume of audio output in the audio output device corresponding to the identification information 614*a* and a volume control bar 614*b*-1 of audio output in the audio output device corresponding to the identification information 614*b* on the display. For example, the guest device may display the volume control bar 614*a*-1 to be adjacent to the identification information 614*a* and display the volume control bar 614*b*-1 to be adjacent to the identification information 614*b*. The guest device may display the list 614 further including check boxes 614*a*-2 and 614*b*-2 for executing or ending audio reproduction in each audio output device on the display. For example, the guest device may display the check box 614*a*-2 to be adjacent to the identification information 614*a* and display the check box 614*b*-2 to be adjacent to the identification information 614*b*.

When a distance between the guest device and the host device becomes longer and thus a connection between the two devices is released or when the user ends a dual mode through a menu displayed on the display of the guest device, the audio sharing function with the host device may be released. When the audio sharing function is released, the guest device may remove the identification information

614*b* and the volume control bars 614*a*-1 and 614*b*-1 from the list 614 and display the icon 617 on the GUI screen 610 again, so as to display, for example, the GUI screen 610 of FIG. 6A on the display.

Figure 6D:
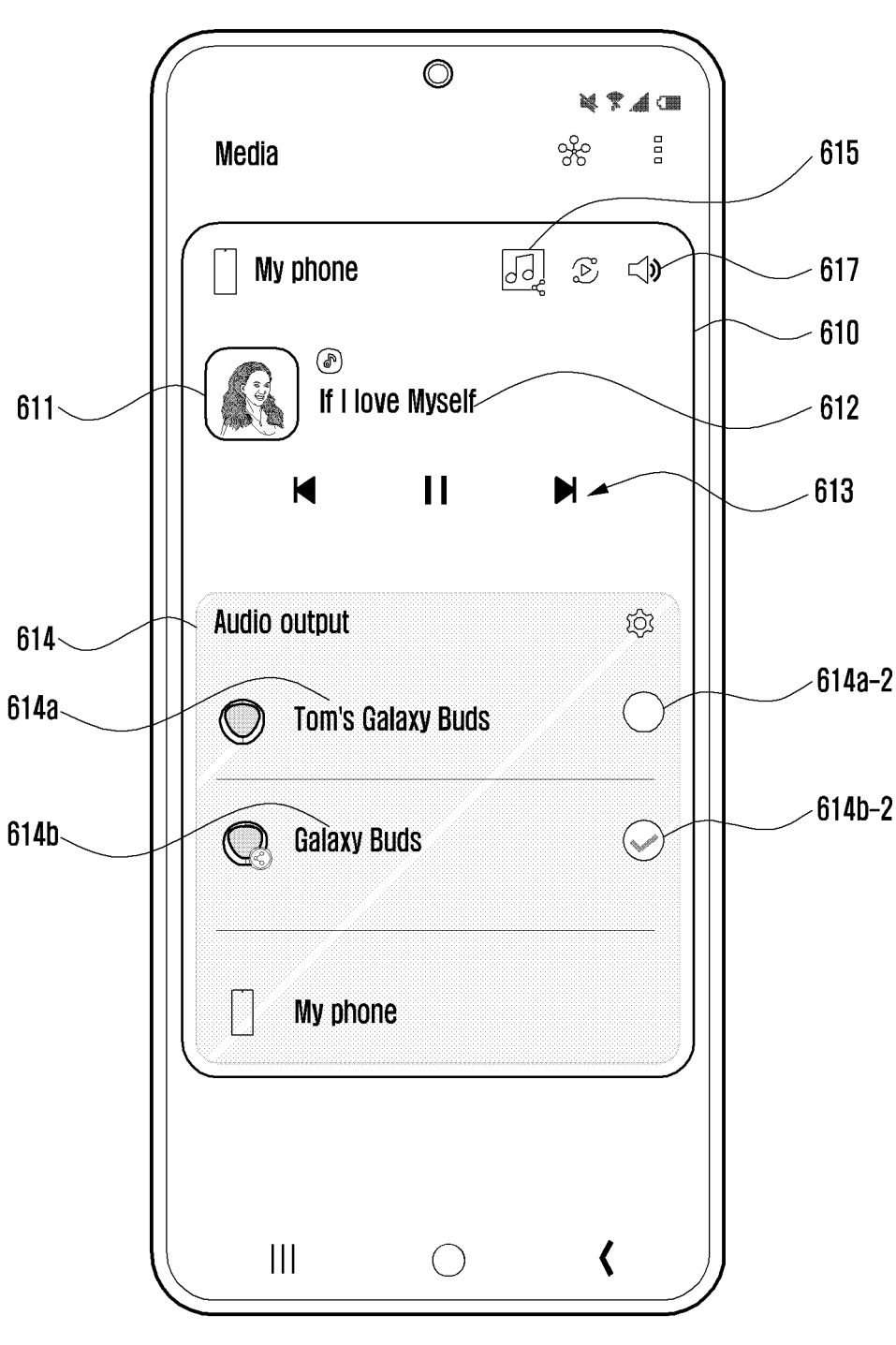

Referring to FIG. 6D, the guest device may remove the check for the check box according to a user input, and, accordingly, end the audio output in the corresponding audio output device and output audio only through another audio output device. For example, the check for the first check box 614*a*-2 may be removed, and thus the audio output in the audio output device of the guest device may end and the audio may be output only through the audio output device of the host device. Further, the guest device may remove the volume control bars 614*a*-1 and 614*b*-1 from the list 614 and display the icon 617 on the GUI screen 610 again.

Figure 7A:
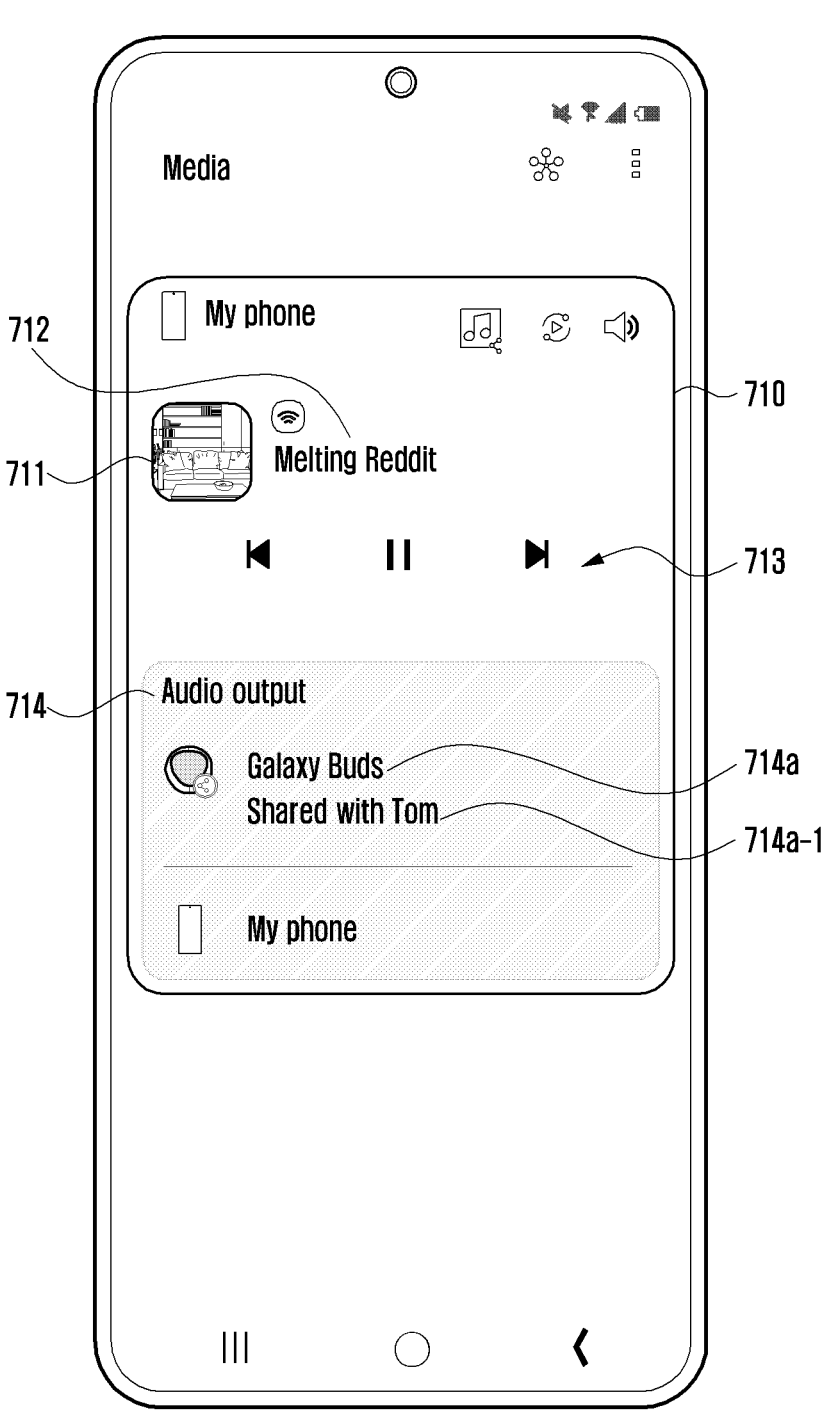
FIGS. 7A and 7B illustrate GUI screens of the reproduction application displayed on the host device according to various embodiments of the disclosure.
Figure 7B:
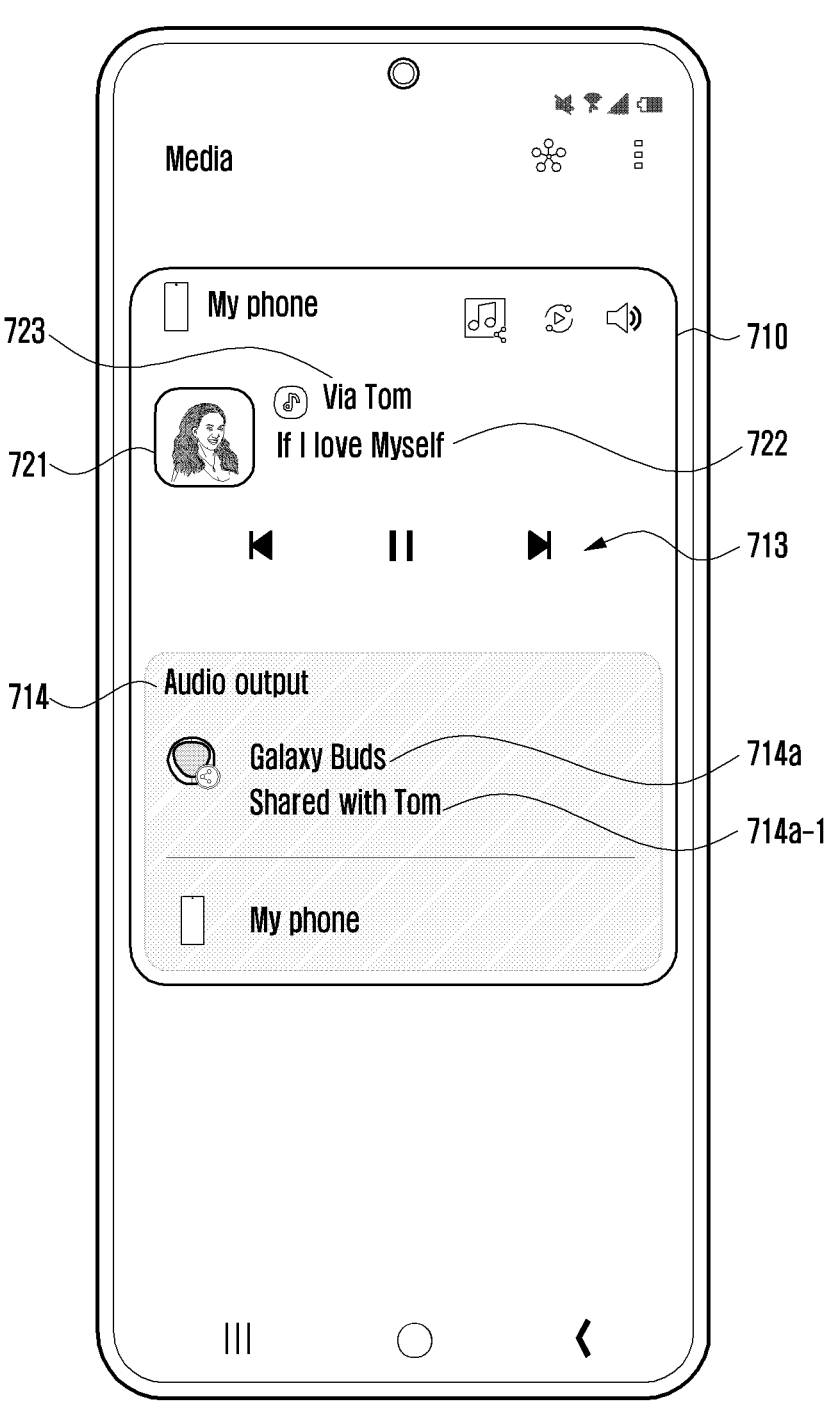

FIGS. 7A and 7B illustrate GUI screens of the reproduction application displayed in the host device according to various embodiments of the disclosure.

Referring to FIG. 7A, the host device (for example, the first electronic device 101 of FIG. 1 or the second electronic device 320 of FIG. 3) may display a GUI screen 710 of the reproduction application (for example, the reproduction application 540 of FIG. 5) on the display (for example, the display module 160 of FIG. 1). For example, the host device may display the GUI screen 710 including a representative image 711 of a song which is being currently reproduced, a song name 712, and a reproduction controller 713 on the display. The host device may display the GUI screen 710 further including an audio output device list 714 on the display. The list 714 may include identification information 714*a* of an audio output device (for example, the second audio output device 321 of FIG. 3) connected to the host device through a short-range wireless communication (for example, Bluetooth) circuit. The audio output device may be configured as a device which can be used by the guest device. Accordingly, the host device may display information 714*a*-1 indicating that the corresponding audio output device is a device shared with the guest device at a location close to the identification information 714*a*.

Referring to FIG. 7B, the host device may receive audio from the guest device, decode the received audio, and output the decoded audio to the audio output device through the short-range wireless communication circuit. For example, when the audio sharing function is in an active state, the host device may stop outputting audio, which is being currently reproduced, to the audio output device and output the audio received from the guest device to the audio output device. The host device may receive the representative image 711 and the song name 712 from the guest device, replace them with a representative image 721 and a song name 722 of the audio output to the audio output device, and display the same. In addition, the host device may display identification information (for example, an owner name) 723 of the guest device to be adjacent to the song name 722 as a source from which the reproduced song is provided.

Figure 8:
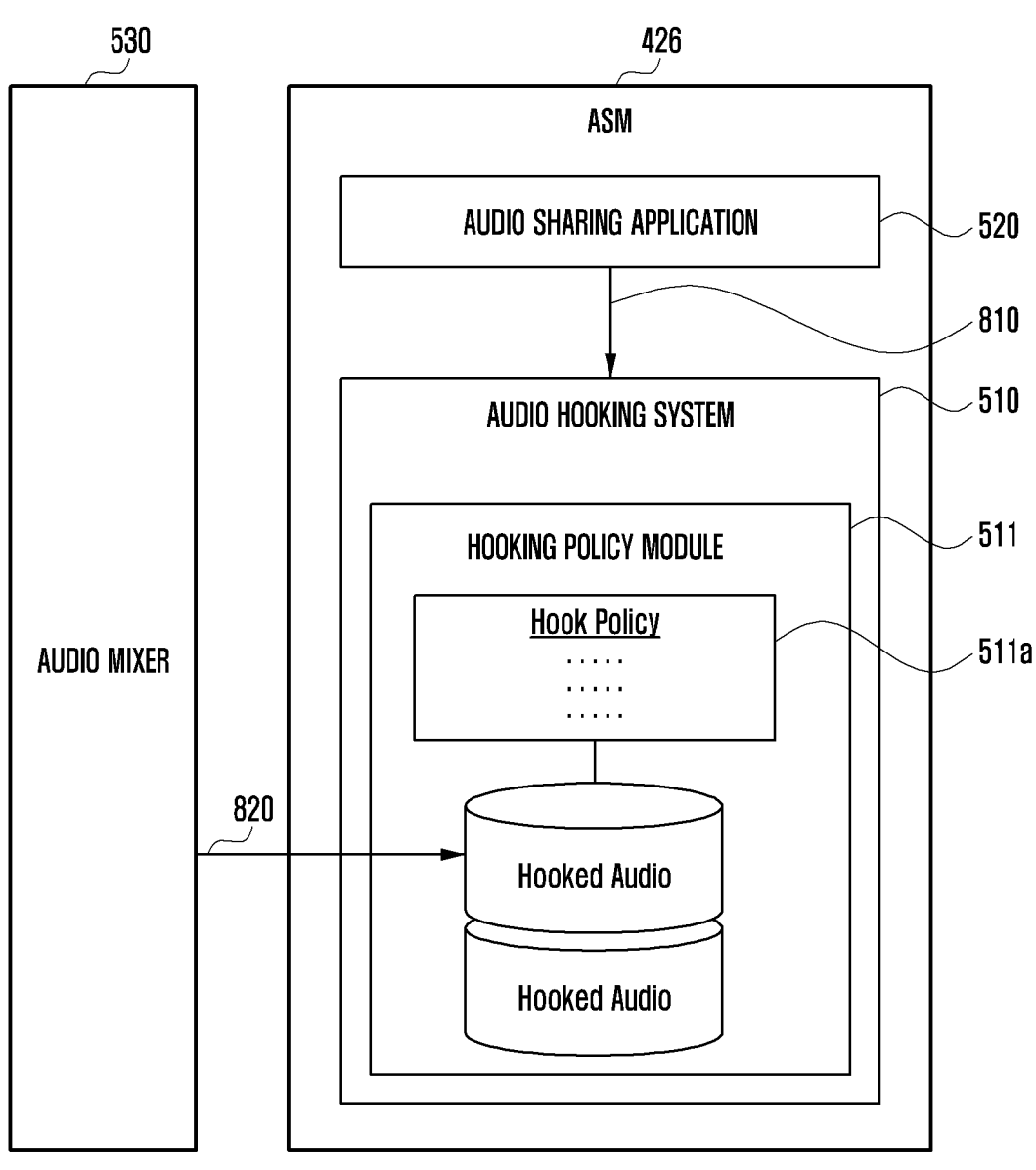
FIG. 8 illustrates an operation in which an audio share manager determines audio to be shared according to an embodiment of the disclosure.

FIG. 8 illustrates an operation in which the audio share manager determines data to be shared according to an embodiment of the disclosure.

Referring to FIG. 8, the audio sharing application 520 may perform an operation 810 of transmitting a message which makes a request for providing audio to be shared to the audio hooking system 510. For example, the audio sharing application 520 may receive a user selection for a target device (for example, a touch input for the product name 622*a* in FIG. 6B) from the display. In response to selection of the target device, the audio sharing application 520 may make a request for audio to be provided to the host device (for example, the second electronic device 320 of FIG. 3) to the audio hooking system 510. In response to the request from the audio sharing application 520, the audio hooking system 510 may perform an operation 820 of loading predetermined audio among audio mixed by the audio mixer 530 from the audio mixer 530. For example, the hooking policy module 511 may load a predetermined type of audio (for example, music) among various types of audio (for example, a clock alarm, a message reception notification sound, a call reception notification sound, a call voice, or music) from the audio mixer 530 on the basis of the hooking policy 511a. In another example, the hooking policy module 511 may load audio which can be reproduced through a predetermined application (for example, a music reproduction application) from the audio mixer 530 on the basis of the hooking policy 511a. In another example, the hooking policy module 511 may load all pieces of audio mixed by the audio mixer 530.

Figure 9:
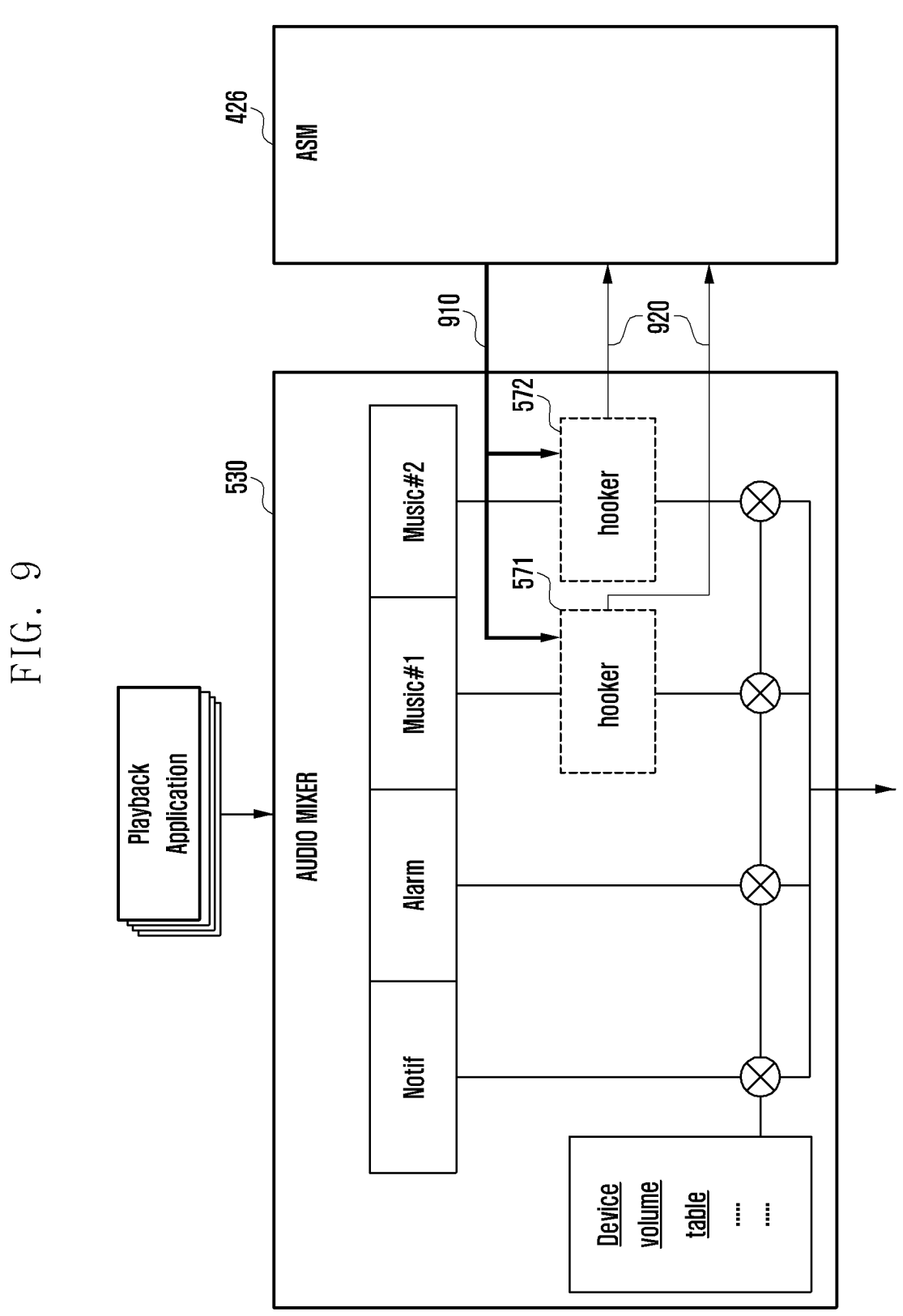
FIG. 9 illustrates an operation in which the audio share manager loads audio to be shared from an audio mixer according to an embodiment of the disclosure.

FIG. 9 illustrates an operation in which the audio share manager loads audio to be shared from the audio mixer according to an embodiment of the disclosure.

Referring to FIG. 9, the audio share manager 426 may perform an operation 910 of adding the hookers 571 and 572 to copy the audio, determined as the audio to be shared, to the audio mixer 530. The hookers 571 and 572 may perform an operation 920 of copying the corresponding audio and transferring the copy to the audio share manager 426. The audio (for example, the alarm, the notification, and the music) mixed by the audio mixer 530 may be decoded and output to the audio output device of the guest device. At least some of the audio to be mixed (for example, music) may be copied by the hookers 571 and 572 and transmitted to the host device. The audio transmitted to the host device may be decoded by the host device and output through the audio output device of the host device.

FIG. 10 illustrates an operation in which the audio share manager determines a volume of audio to be shared, to be transmitted to the host device, according to an embodiment of the disclosure.

Referring to FIG. 10, the hooking policy module 511 may perform an operation 1010 of transferring audio loaded from the audio mixer 530 to the volume policy module 512 on the basis of the hooking policy 511a. The volume policy module 512 may determine a volume of the audio to be shared on the basis of a predefined volume policy 512a. In an embodiment, the volume policy module 512 may determine a volume of the copy to have a value which is the same as a volume of the original sound reproduced in the guest device. Accordingly, the original sound and the copy may be output with the same volume. In another embodiment, the volume policy module 512 may determine the volume of the copy to have a value different (for example, a predetermined value) form the volume of the original sound reproduced in the guest device. Accordingly, the original sound and the copy may be output with different volumes. For example, even though the original sound is configured to be output with a low volume, the copy may be configured to be output with a high volume independently therefrom. The volume policy module 512 may apply a volume according to the determination to the audio received from the hooking policy module 511. For example, the volume policy module 512 may configure a value indicating the determined volume of the audio as the volume of the audio. The volume policy module 512 may perform an operation 1030 of transferring audio having the volume configured according to the volume policy to the audio sharing application 520 as audio 1020 to be shared.

Figure 11:
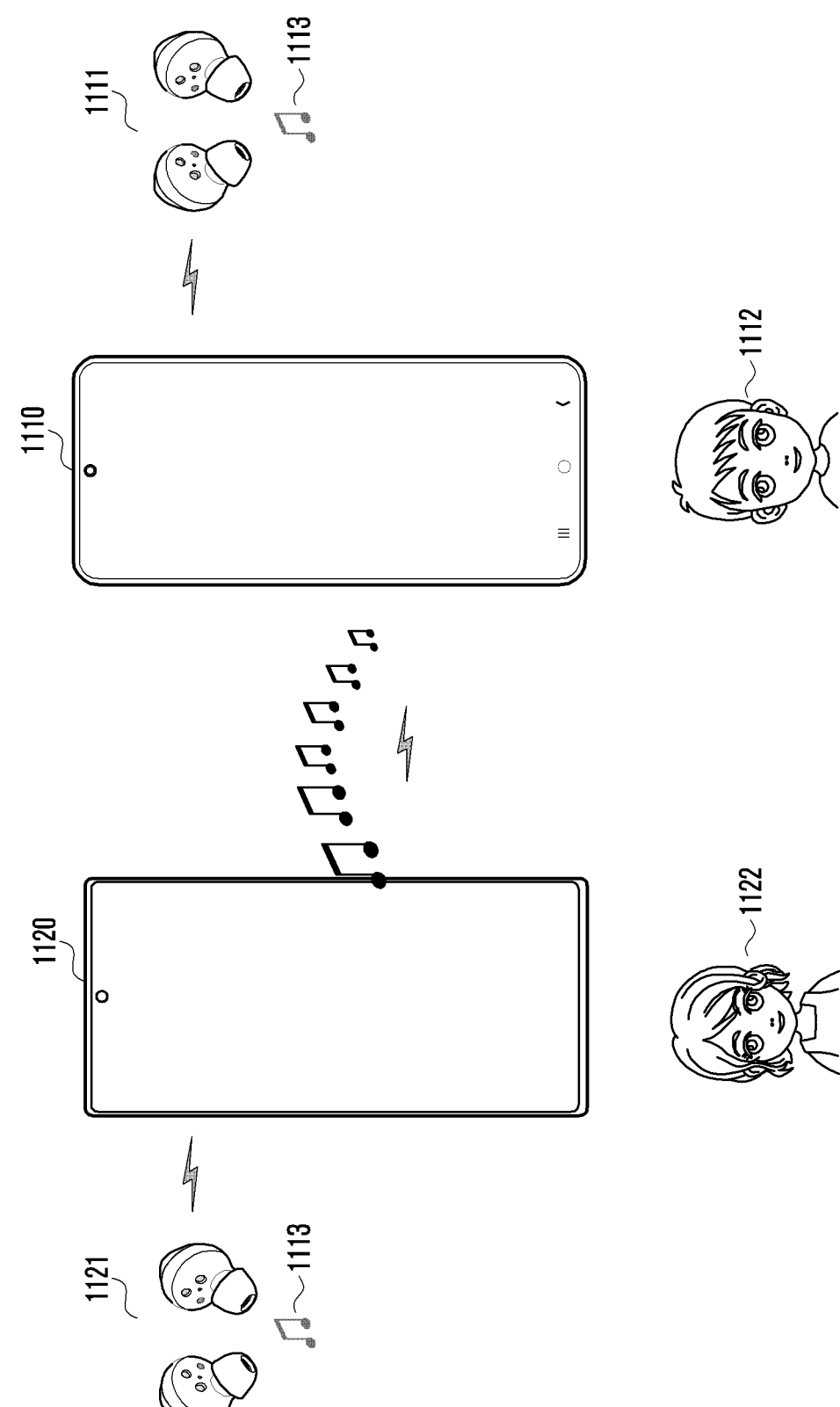
FIG. 11 illustrates a method by which the audio sharing system outputs the same audio through a plurality of audio output devices according to an embodiment of the disclosure.

FIG. 11 illustrates a method by which the audio sharing system outputs the same audio through a plurality of audio output devices according to an embodiment of the disclosure.

Referring to FIG. 11, a first electronic device 1110 (for example, the first electronic device 310 of FIG. 3) may output audio 1113 to a first audio output device 1111 through a short-range wireless communication (for example, Bluetooth) circuit. A user 1122 of a second electronic device 1120 may activate an audio sharing function of the second electronic device 1120 according to a request of a user 1112 of the first electronic device 1110. The second electronic device 1120 (For example, the second electronic device 320 of FIG. 3) may receive the audio 1113 from the first electronic device 1110 through a short-range wireless communication (for example, Bluetooth, Wi-Fi direct, or Wi-Fi Aware) circuit on the basis of at least activation of the audio sharing function. The second electronic device 1120 may output the audio 1113 to the second audio output device 1121 through the short-range wireless communication (for example, Bluetooth) circuit. Accordingly, audio which is the same as the audio output from the first audio output device 1111 may be substantially simultaneously output through the second audio output device 1121.

According to an embodiment, the first electronic device 1110 may change an audio path (or an audio output path) from the first audio output device 1111 to the second audio output device 1121. For example, the first electronic device 1110 may display a GUI screen (for example, the GUI screen 610 of FIG. 6C) for controlling audio reproduction on the display. Through the GUI screen, the first electronic device 1110 may receive a user input (for example, the touch input for the check box 614a-2 of FIG. 6C) making a request for stopping the audio output from the first audio output device 1111. Accordingly, the audio output from the first audio output device 1111 may be stopped and audio may be output only through the second audio output device 1121. In another example, when the first electronic device 1110 receives a call for a phone call (a video or voice call), the first electronic device 1110 may stop the audio output to the first audio output device 1111 and maintain audio transmission to the second electronic device 1120. When call reception is stopped or the call ends, the first electronic device 1110 may resume the audio output to the first audio output device 1111. In another example, when the second electronic device 1120 receives a call for a phone call, the second electronic device 1120 may stop audio reception from the first electronic device 1110. When call reception is stopped or the call ends, the second electronic device 1120 may resume the audio reception from the first electronic device 1110.

Figure 12:
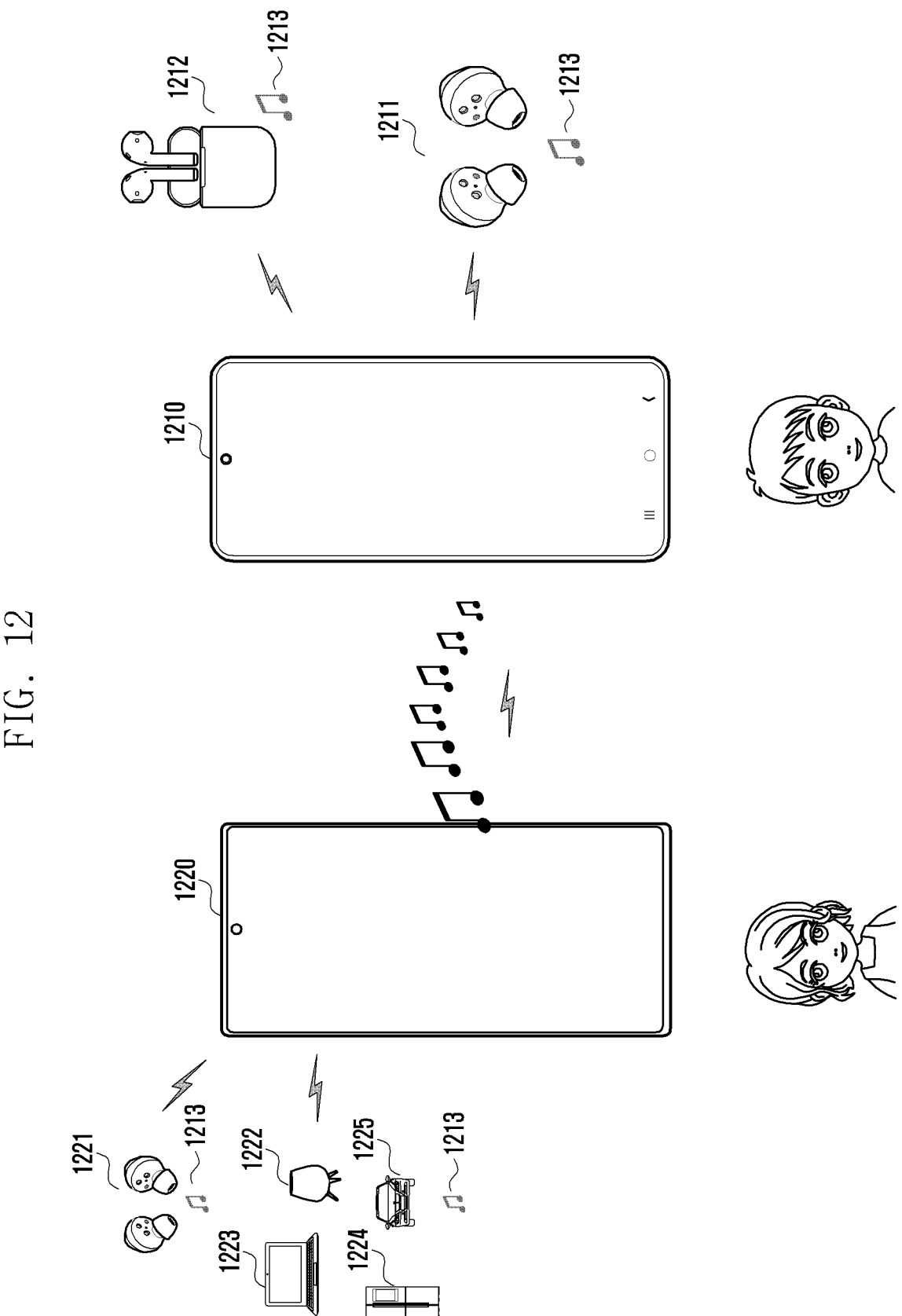
FIG. 12 illustrates a method by which the audio sharing system outputs the same audio through a plurality of audio output devices according to an embodiment of the disclosure.

FIG. 12 illustrates a method by which the audio sharing system outputs the same audio through a plurality of audio output devices according to an embodiment of the disclosure.

Referring to FIG. 12, a first electronic device 1210 (for example, the first electronic device 310 of FIG. 3) may output audio 1213 to at least one of first audio output devices 1211 and 1212 through a short-range wireless communication (for example, Bluetooth) circuit. A second electronic device 1220 may receive the audio 1213 from the first electronic device 1210 through a short-range wireless communication (for example, Bluetooth, Wi-Fi direct, or Wi-Fi Aware) circuit on the basis of at least activation of an audio sharing function of the second electronic device 1220 (for example, the second electronic device 320 of FIG. 3). The second electronic device 1220 may be connected to at least one of a plurality of second audio output devices 1221, 1222, 1223, 1224, and 1225 through a short-range wireless communication (for example, Bluetooth) circuit. For example, an audio output device installed in home appliances (for example, a TV and a refrigerator), an audio output device installed in a vehicle, or a speaker (for example, an AI speaker) may be wirelessly connected to the second electronic device 1220. The second electronic device 1220 may output the audio 1213 received from the first electronic device 1210 to at least one target device selected by the first electronic device 1210 among at least one connected audio output device.

Figure 13:
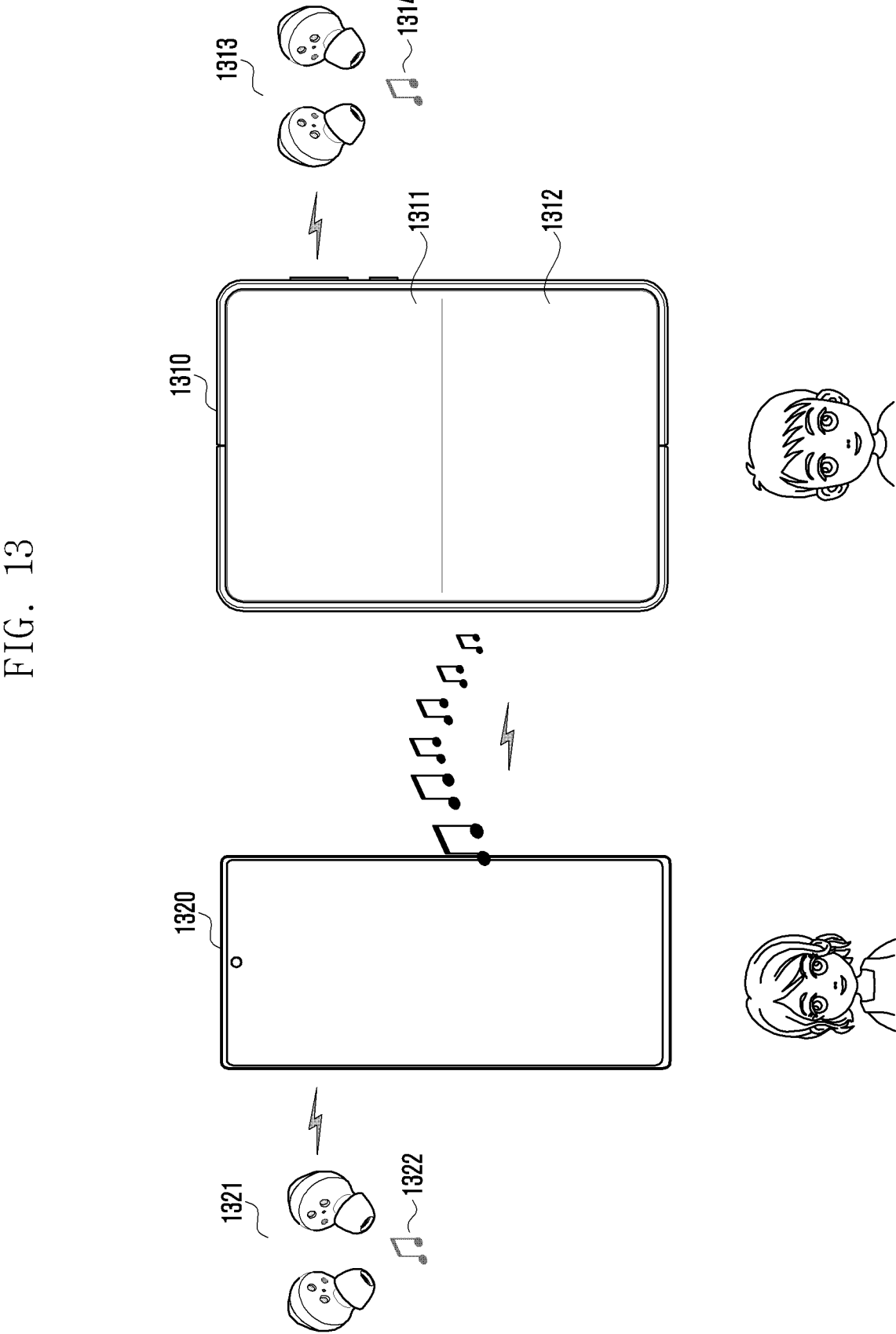
FIG. 13 illustrates a method by which the audio sharing system outputs different pieces of audio through a plurality of audio output devices according to an embodiment of the disclosure.

FIG. 13 illustrates a method by which the audio sharing system outputs different pieces of audio through a plurality of audio output devices according to an embodiment of the disclosure.

Referring to FIG. 13, a first electronic device 1310 (For example, the first electronic device 310 of FIG. 3) may be implemented as a foldable portable electronic device or a rollable portable device. The foldable portable electronic device may have, for example, a folding axis and a foldable housing which is folded and unfolded with respect thereto. The foldable housing may be divided into two housings with respect to the folding axis. A first part 1311 of the flexible display may be arranged on the first housing and a second part 1312 of the flexible display may be arranged on the second housing, and the first part 1311 and the second part 1312 may face each other or face in opposite directions in the state in which the portable electronic device is folded. The rollable portable electronic device has, for example, a display which can be bended and thus may mean an electronic device, of which at least a part is wound or rolled or received by the inside of a housing (not shown). The first electronic device 1310 may output first audio 1314 to a first audio output device 1313 through a wireless communication (for example, Bluetooth) circuit. The first electronic device 1310 may display information on the first audio 1314 (for example, a song name or a representative image), a controller for controlling reproduction of the first audio 1314, and/or a volume control bar on a part of the display (for example, the first part 1311).

The first electronic device 1310 may output audio different from the first audio 1314 to a second audio output device 1321 through a second electronic device 1320 (for example, the second electronic device 320 of FIG. 3). For example, the first electronic device 1310 may display information on second audio 1322 (for example, a song name or a representative image) to be output to the second audio output device 1232 through the second electronic device 1320, a controller for controlling reproduction of the second audio 1322, and a volume control bar on another part of the display (for example, the second part 1312). The first electronic device 1310 may transmit the second audio 1322 to the second electronic device 1320 through a short-range wireless communication (for example, Bluetooth, Wi-Fi direct, or Wi-Fi Aware) circuit on the basis of at least the activation of the audio sharing function of the second electronic device 1320 and the user selection of the second audio 1322 as the audio to be transmitted to the second electronic device 1320. The second electronic device 1320 may output the second audio 1322 to the second audio output device 1321 through a short-range wireless communication (for example, Bluetooth) circuit.

Figure 14:
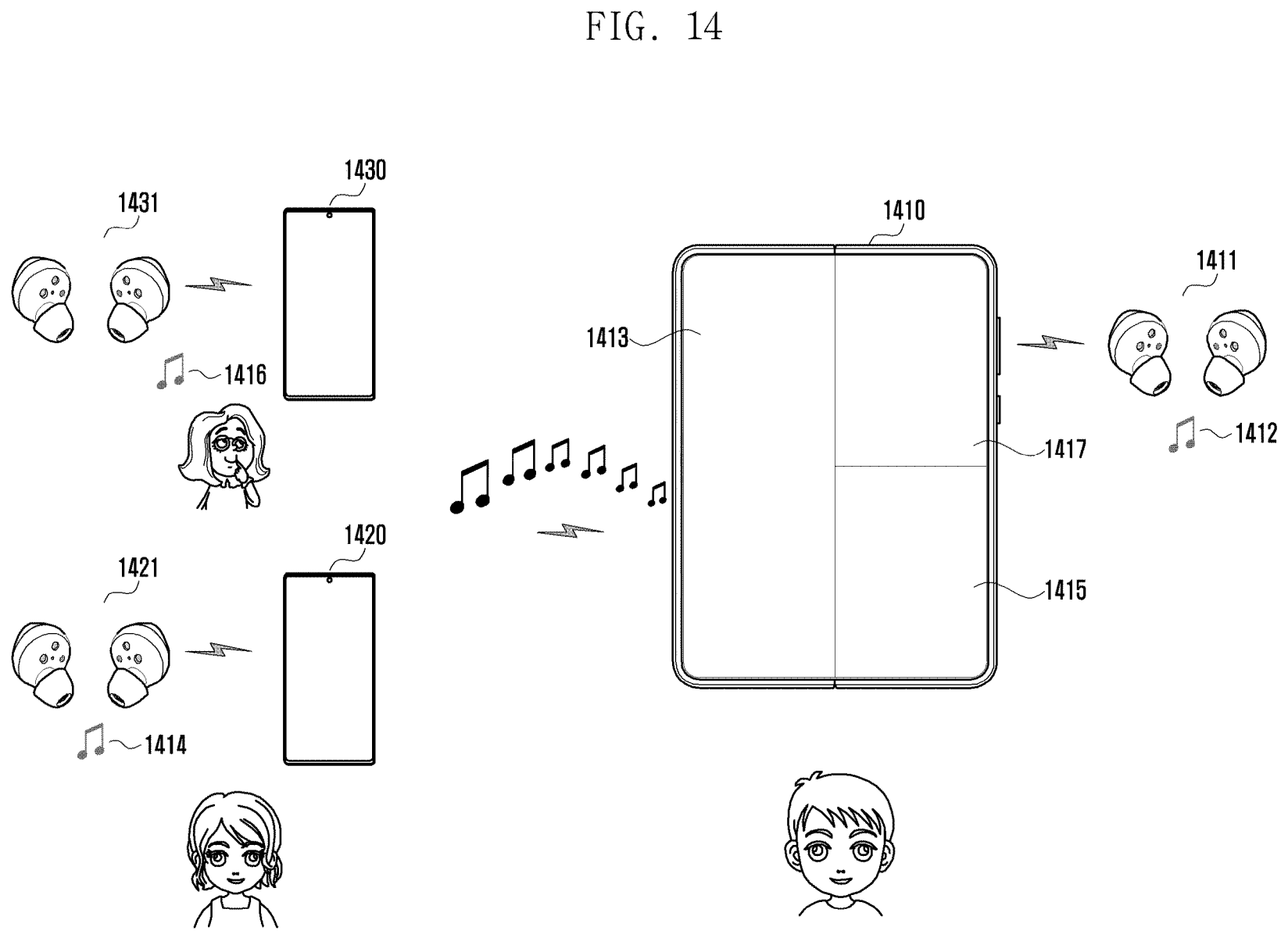

FIG. 14 illustrates a method by which the audio sharing system outputs different pieces of audio through a plurality of audio output devices according to an embodiment of the disclosure.

Referring to FIG. 14, a first electronic device 1410 (for example, the first electronic device 310 of FIG. 3) may be implemented as a foldable portable electronic device or a rollable portable electronic device. The first electronic device 1410 may output first audio 1412 to a first audio output device 1411 connected through a wireless communication (for example, Bluetooth) circuit. The first electronic device 1410 may display information on the first audio 1412 (for example, a song name or a representative image), a controller for controlling reproduction of the first audio 1412, and a volume control bar on a part of the display (for example, a first part 1413).

The first electronic device 1410 may output a plurality of pieces of audio different from the first audio 1314 to the outside through a plurality of external electronic devices. For example, the first electronic device 1410 may display information on second audio 1414 (for example, a song name and a representative image) to be output to a second audio output device 1421 through a second electronic device 1420, a controller for controlling reproduction of the second audio 1414, and a volume control bar on another part of the display (for example, a second part 1415). The first electronic device 1410 may display information on third audio 1416 (for example, a song name and a representative image) to be output to a third audio output device 1431 through a third electronic device 1430, a controller for controlling reproduction of the third audio 1416, and a volume control bar on another part of the display (for example, a third part 1417).

The first electronic device 1410 may transmit the second audio 1414 to the second electronic device 1420 through a short-range wireless (for example, Bluetooth, Wi-Fi direct, or Wi-Fi Aware) circuit on the basis of at least the activation of the audio sharing function of the second electronic device 1420 and the user selection of the second audio 1414 as the audio to be transmitted to the second electronic device 1420. The second electronic device 1420 may output the second audio 1421 to the second audio output device 1414 through a short-range wireless (for example, Bluetooth) circuit. The first electronic device 1410 may transmit the third audio 1416 to the third electronic device 1430 through a short-range wireless (for example, Bluetooth, Wi-Fi direct, or Wi-Fi Aware) circuit on the basis of at least the activation of the audio sharing function of the third electronic device 1430 and the user selection of the third audio 1416 as the audio to be transmitted to the third electronic device 1430. The third electronic device 1430 may output the third audio 1416 to the third audio output device 1431 through a short-range wireless communication (for example, Bluetooth) circuit.

Figure 15:
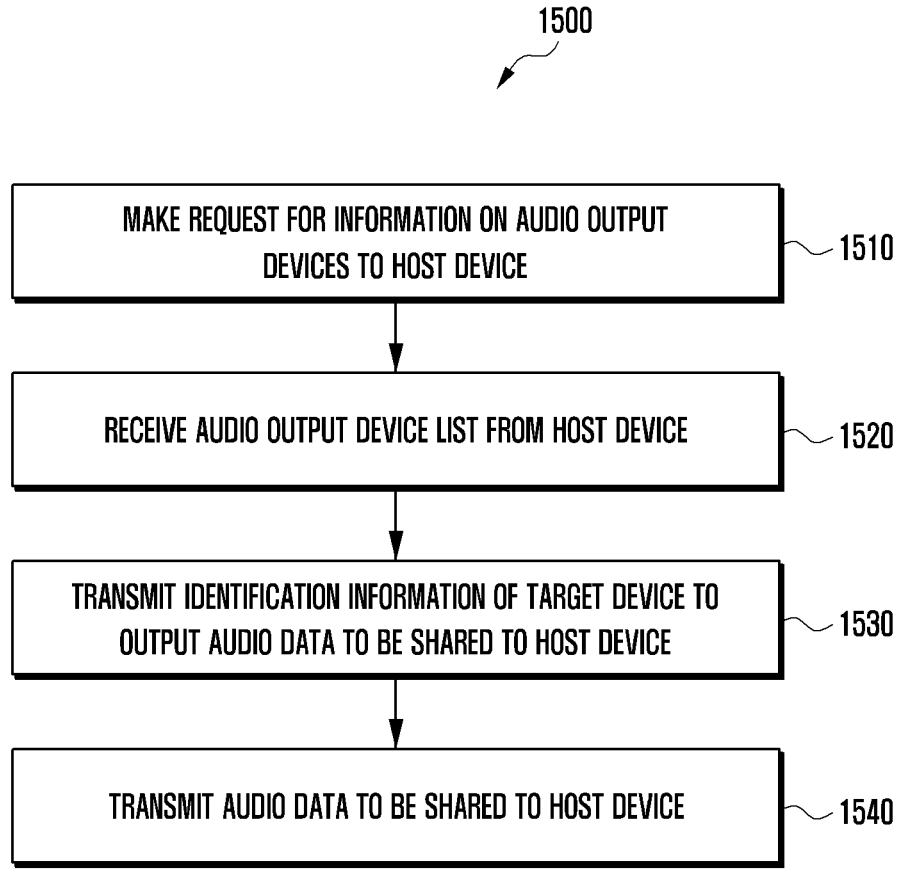
FIG. 15 is a flowchart illustrating operations 1500 for sharing audio according to an embodiment of the disclosure.

FIG. 15 is a flowchart illustrating operations for sharing audio according to an embodiment of the disclosure.

In an embodiment, the operation 1500 may be performed by a processor (for example, the processor 120 of FIG. 1) of a guest device. In an embodiment, a memory (for example, the memory 130 of FIG. 1) may store instructions to cause the processor to perform the operations 1500 when executed.

In operation 1510, the processor may transmit a message making a request for information on audio output devices wirelessly connected to a host device to the host device through a wireless communication (for example, Bluetooth, Wi-Fi direct, or Wi-Fi Aware) circuit. For example, the guest device may display an icon (for example, the icon 617 of FIG. 6A) for initiating audio reproduction using the host device on the display and transmit a request message to the host device in response to a user input for the displayed icon.

When an audio sharing function is activated, the host device may transmit a list of one or more audio output devices to the guest device in response to the request.

In operation 1520, the processor may display the audio output device list (for example, the list 622 of FIG. 6B) received from the host device through the short-range wireless communication circuit on the display.

In operation 1530, the processor may transmit identification information (for example, the product name 622*a* of FIG. 6B) of a target device to output audio to be shared, selected by the user from the list to the host device.

In operation 1540, the processor may transmit the audio to be shared to the host device in order to output the audio to be shared through the target device. In an embodiment, the processor may determine at least one piece of the audio as the audio to be transmitted to the target device on the basis of a predefined policy (for example, the hooking policy 511*a* of FIG. 5) for audio sharing. For example, the processor may select audio which is being output through the audio output device wirelessly connected to the guest device as the data to be shared. In another example, the processor may select (pieces of) audio in a list which waits to be reproduced as the audio to be shared. When selecting the data to be shared, the processor may exclude predetermined types of audio (for example, a clock alarm, a message reception notification sound, a call reception notification sound, and a call voice). When selecting the audio to be shared, the processor may include audio, which is reproduced using a predetermined application (for example, a music reproduction application), as the audio to be shared. The processor may determine a volume on the basis of a predefined volume policy (for example, the volume policy 512*a* of FIG. 5) and add a value indicating the determined volume to audio to be shared, which is to be transmitted to the host device.

In various embodiments, an electronic device (for example, the first electronic device 310 of FIG. 3) may include: a communication circuit for short-range wireless communication with an external electronic device; a touch-sensitive display; and a processor connected to the communication circuit and the display, wherein the processor may be configured to receive a list of at least one audio output device wirelessly connected to the external electronic device from the external electronic device through the communication circuit, display the list on the display, select a target device from among the at least one audio output device, based on a user input received from the display while the list is displayed, and transmit information on the target device and audio to be output through the target device through the communication circuit.

The processor may be configured to copy audio to be output to a first audio output device wirelessly connected to the electronic device through the communication circuit as audio to be shared, which is to be transmitted to the external electronic device.

The processor may be configured to copy predetermined audio among a plurality of pieces of audio to be output to the first audio output device as the audio to be shared. The processor may be configured to select music from among the plurality of pieces of audio as the audio to be shared. The processor may be configured to exclude at least one of a clock alarm, a message reception notification sound, a call reception notification sound, and a call voice from the audio to be shared.

The processor may be configured to determine a volume of the copy, configure a value indicating the determined volume as the volume of the copy, and transmit the value to the external electronic device. The processor may be configured to configure a volume of the copy to be different from a volume configured when an original sound of the copy is output.

The processor may be configured to stop outputting the audio to a first audio output device wirelessly connected to the electronic device through the communication circuit. The processor may be configured to stop outputting the audio to the first audio output device, based on a user input received from the display while the audio is output to the first audio output device and transmitted to the external electronic device.

The processor may be configured to stop outputting the audio to the first audio output device, based on at least selection of the target device as a second audio output device to output the audio while the audio is output to the first audio output device through the communication circuit. The processor may be configured to recognize a type of the target device, based on a product name of the target device included in the list, output the audio to the first audio output device and the second audio output device when the recognized type is wireless earphones, and stop outputting the audio to the first audio output device when the recognized type is a device different from the wireless earphones. The device different from the wireless earphones may be a home appliance, a vehicle, or a speaker.

The processor may be configured to display a first volume control bar for controlling a volume of audio output to an audio output device wirelessly connected to the electronic device through the communication circuit and a second volume control bar for controlling a volume of audio output to the target device through the external electronic device on the display.

The communication circuit may include a Bluetooth communication circuit and a Wi-Fi communication circuit, and the processor may be configured to output the audio to a first audio output device through the Bluetooth communication circuit and transmit a copy of the audio to the external electronic device through the Wi-Fi communication circuit.

The communication circuit may include a Bluetooth communication circuit and a Wi-Fi communication circuit, and the processor may be configured to output first audio to a first audio output device through the Bluetooth communication circuit and transmit second audio different from the first audio to the external electronic device through the Wi-Fi communication circuit.

In various embodiments, an electronic device (for example, the second electronic device 320 of FIG. 3) may include: a first communication circuit for short-range wireless communication with an external electronic device; a second communication circuit for short-range wireless communication with an audio output device; and a processor connected to the first communication circuit and the second communication circuit, wherein the processor may be configured to transmit a list of at least one audio output device connected to the electronic device through the second communication circuit to the external electronic device through the first communication circuit, receive identification information of a target device among the at least one audio output device from the external electronic device through the first communication circuit, and output audio received from the external electronic device through the first communication circuit to the target device through the second communication circuit.

The processor may be configured to stop outputting first audio to the audio output device and output second audio received from the external electronic device to the audio output device, based on at least activation of an audio sharing function of the electronic device.

The electronic device may further include a display and may be configured to display information on the external electronic device as a source of the second audio on a display of the electronic device.

The processor may be configured to perform data communication with a Wi-Fi communication circuit as the first communication circuit and output the audio to the target device through a Bluetooth communication circuit as the second communication circuit.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit for short-range wireless communication with an external electronic device;
a touch-sensitive display; and
a processor connected to the communication circuit and the display,
wherein the processor is configured to:
receive, from the external electronic device through the communication circuit, a list of at least one audio output device wirelessly connected to the external electronic device, the list including a product name of the at least one audio output device,
display the list on the display,
select a target device from among the at least one audio output device, based on a user input received from the display while the list is displayed, and
transmit, to the external electronic device through the communication circuit, information on the target device and audio to be output through the target device, and
wherein the processor is further configured to:
recognize a type of the target device, based on a product name of the target device included in the list,
based on the recognized type being wireless earphones, output the audio through the communication circuit to a first audio output device and output the audio through the communication circuit to the target device as a second audio output device, and
based on the recognized type being a device different from the wireless earphones, stop outputting the audio to the first audio output device and output the audio through the communication circuit to the target device.

2. The electronic device of claim 1, wherein the processor is further configured to copy audio to be output to the first audio output device wirelessly connected to the electronic device through the communication circuit as audio to be shared, which is to be transmitted to the external electronic device.

3. The electronic device of claim 2, wherein the processor is further configured to copy predetermined audio among a plurality of pieces of audio to be output to the first audio output device as the audio to be shared.

4. The electronic device of claim 3, wherein the processor is further configured to:
select music from among the plurality of pieces of audio as the audio to be shared; and exclude at least one of a clock alarm, a message reception notification sound, a call reception notification sound, or a call voice from the audio to be shared.

5. The electronic device of claim 2, wherein the processor is further configured to:
configure a second volume of the copy to be different from a first volume configured based on an original sound of the copy being output; and
transmit a value indicating the second volume to the external electronic device.

6. The electronic device of claim 1, wherein the processor is further configured to:
output the audio to the first audio output device wirelessly connected to the electronic device through the communication circuit; and
stop outputting the audio to the first audio output device, based on a user input received from the display while the audio is transmitted to the external electronic device.

7. The electronic device of claim 1, wherein the processor is further configured to stop outputting the audio to the first audio output device, based on at least selection of the target device as the second audio output device to output the audio while the audio is output to the first audio output device through the communication circuit.

8. The electronic device of claim 7, wherein the device different from the wireless earphones is a home appliance, a vehicle, or a speaker.

9. The electronic device of claim 1,
wherein the processor is further configured to:
display a first volume control bar for controlling a volume of audio output to an audio output device wirelessly connected to the electronic device through the communication circuit, and
display a second volume control bar for controlling a volume of audio output to the target device through the external electronic device on the display.

10. The electronic device of claim 1,
wherein the communication circuit comprises a Bluetooth communication circuit and a wireless-fidelity (Wi-Fi) communication circuit, and
wherein the processor is further configured to:
output the audio to the first audio output device through the Bluetooth communication circuit, and
transmit a copy of the audio to the external electronic device through the Wi-Fi communication circuit.

11. The electronic device of claim 1,
wherein the communication circuit comprises a Bluetooth communication circuit and a Wi-Fi communication circuit, and
wherein the processor is further configured to:
output first audio to the first audio output device through the Bluetooth communication circuit, and
transmit second audio different from the first audio to the external electronic device through the Wi-Fi communication circuit.

12. An electronic device comprising:
a first communication circuit for short-range wireless communication with an external electronic device;
a second communication circuit for short-range wireless communication with an audio output device; and
a processor connected to the first communication circuit and the second communication circuit,
wherein the processor is configured to:
transmit, to the external electronic device through the first communication circuit, a list of at least one audio output device connected to the electronic device through the second communication circuit, the list including a product name of the at least one audio output device, receive, from the external electronic device through the first communication circuit, identification information of a target device among the at least one audio output device, and output, to the target device through the second communication circuit, audio received from the external electronic device through the first communication circuit, and wherein a volume of audio received from the external electronic device and output to the target device is specified by a user of the external electronic device and the volume meets a share volume policy of the external electronic device.

13. The electronic device of claim 12, wherein the processor is further configured to:

stop outputting first audio to the audio output device and output second audio received from the external electronic device to the audio output device, based on at least activation of an audio sharing function of the electronic device; and display information on the external electronic device as a source of the second audio on a display of the electronic device.

14. The electronic device of claim 12, wherein the processor is further configured to:

perform data communication with a wireless-fidelity (Wi-Fi) communication circuit as the first communication circuit; and output the audio to the target device through a Bluetooth communication circuit as the second communication circuit.

15. A method of operating an electronic device, the method comprising:

receiving, from an external electronic device through a short-range wireless communication circuit of the electronic device, a list of at least one audio output device wirelessly connected to the external electronic device, the list including a product name of the at least one audio output device;

displaying the list on a touch-sensitive display of the electronic device;

selecting a target device from among the at least one audio output device, based on a user input received from the display while the list is displayed; and transmitting, to the external electronic device through the short-range wireless communication circuit, information on the target device and audio to be output through the target device to the external electronic device, recognizing a type of the target device, based on a product name of the target device included in the list, based on the recognized type being wireless earphones, outputting the audio through the short-range wireless communication circuit to a first audio output device and output the audio through the short-range wireless communication circuit to the target device as a second audio output device, and based on the recognized type being a device different from the wireless earphones, stopping outputting the audio to the first audio output device and outputting the audio through the short-range wireless communication circuit to the target device.

* * * * *